United States Patent
Koyama et al.

(10) Patent No.: US 10,133,888 B2
(45) Date of Patent: Nov. 20, 2018

(54) DATA READER AND POSITIONING SYSTEM

(75) Inventors: Toshimi Koyama, Tokyo (JP); Nobuyuki Nonaka, Tokyo (JP); Norio Kotera, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1119 days.

(21) Appl. No.: 11/536,019

(22) Filed: Sep. 28, 2006

(65) Prior Publication Data

US 2008/0231420 A1    Sep. 25, 2008

(30) Foreign Application Priority Data

| Oct. 6, 2005 | (JP) | 2005-293984 |
| Feb. 16, 2006 | (JP) | 2006-039527 |
| May 11, 2006 | (JP) | 2006-132809 |
| May 11, 2006 | (JP) | 2006-132810 |
| Aug. 1, 2006 | (JP) | 2006-209923 |

(51) Int. Cl.
| G06K 7/10 | (2006.01) |
| G01S 5/14 | (2006.01) |
| G01S 13/82 | (2006.01) |
| G01S 11/06 | (2006.01) |
| G06K 17/00 | (2006.01) |

(52) U.S. Cl.
CPC ........... G06K 7/10079 (2013.01); G01S 5/14 (2013.01); G01S 13/82 (2013.01); G06K 7/10316 (2013.01); G06K 7/10326 (2013.01); *G01S 11/06* (2013.01); *G06K 2017/0045* (2013.01)

(58) Field of Classification Search
CPC .. H04Q 5/22; B65G 1/137; G01S 5/15; G01S 5/04; G01S 5/02; G01S 5/0252; G01S 13/82; G01S 5/14; G01S 11/06; G06K 17/00; G06K 7/10079; G06K 7/10316; G06K 7/10326
USPC ........................................................ 340/10.1
See application file for complete search history.

(56) References Cited

U.S. PATENT DOCUMENTS

| 6,330,971 B1 * | 12/2001 | Mabry | G03F 7/70541 235/376 |
| 7,528,721 B2 * | 5/2009 | Levin | G01S 1/54 235/375 |
| 2004/0266481 A1 * | 12/2004 | Patel | G01S 5/04 455/558 |

(Continued)

FOREIGN PATENT DOCUMENTS

| JP | 10-334198 | 12/1998 |
| JP | 2005-303402 | 10/2005 |

(Continued)

*Primary Examiner* — Ian J Lobo
(74) *Attorney, Agent, or Firm* — Lex IP Meister, PLLC

(57) ABSTRACT

A data reader can read data regardless of the position of a radio IC tag. The data reader reads data at a separate position from a radio IC tag provided with a storage unit storing data and a communicating antenna for transmitting the data stored in the storage unit, and includes a reader/writer for generating a modulated signal by modulating a carrier wave and a plurality of antenna units for transmitting radio waves for a read for communicating data with a storage medium by radiating the modulated signal into the air. The reader/writer includes a phase adjustment circuit for changing the phase of a carrier wave.

13 Claims, 28 Drawing Sheets

(56) References Cited

U.S. PATENT DOCUMENTS

| | | | |
|---|---|---|---|
| 2006/0022800 A1* | 2/2006 | Krishna | G06K 7/0008 340/10.2 |
| 2009/0146816 A1* | 6/2009 | Patel | G01S 5/04 340/572.1 |
| 2017/0181118 A1* | 6/2017 | Charvat | H01Q 1/525 |

FOREIGN PATENT DOCUMENTS

| | | |
|---|---|---|
| JP | 2005-306502 | 11/2005 |
| JP | 2005-332026 | 12/2005 |

* cited by examiner

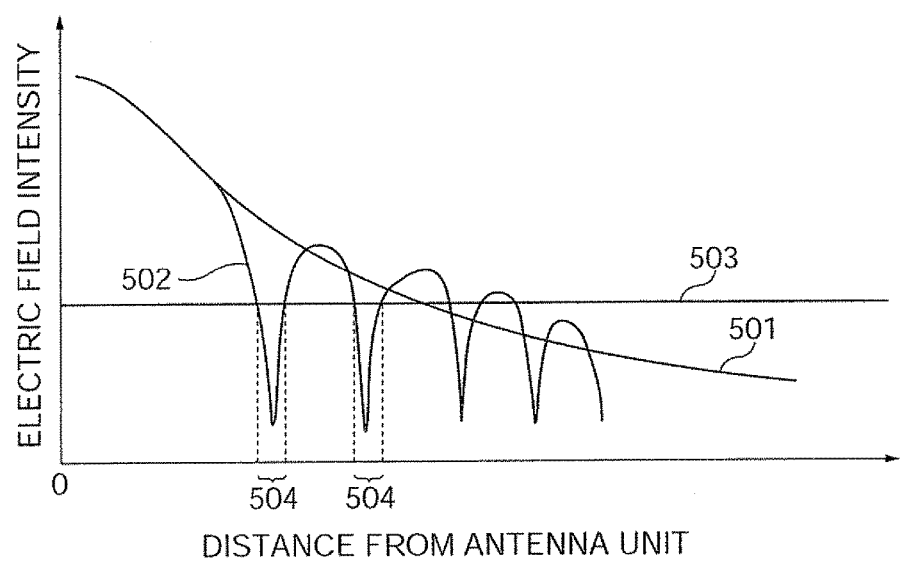

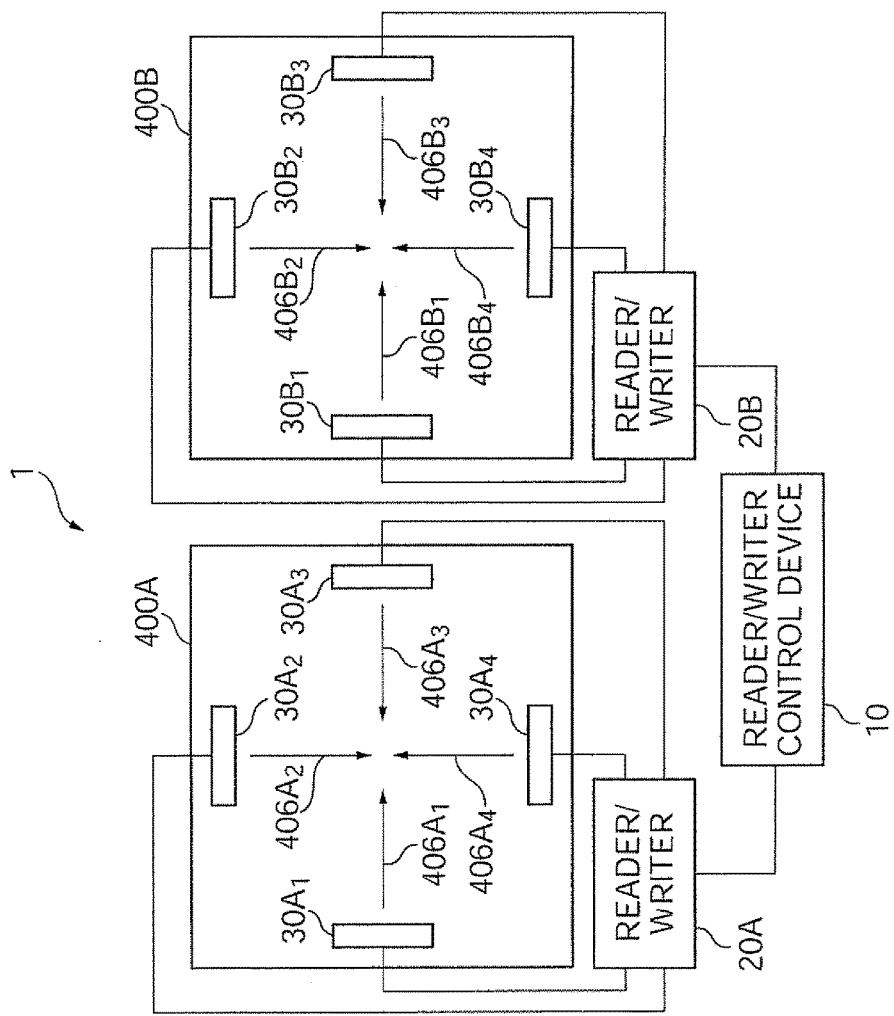

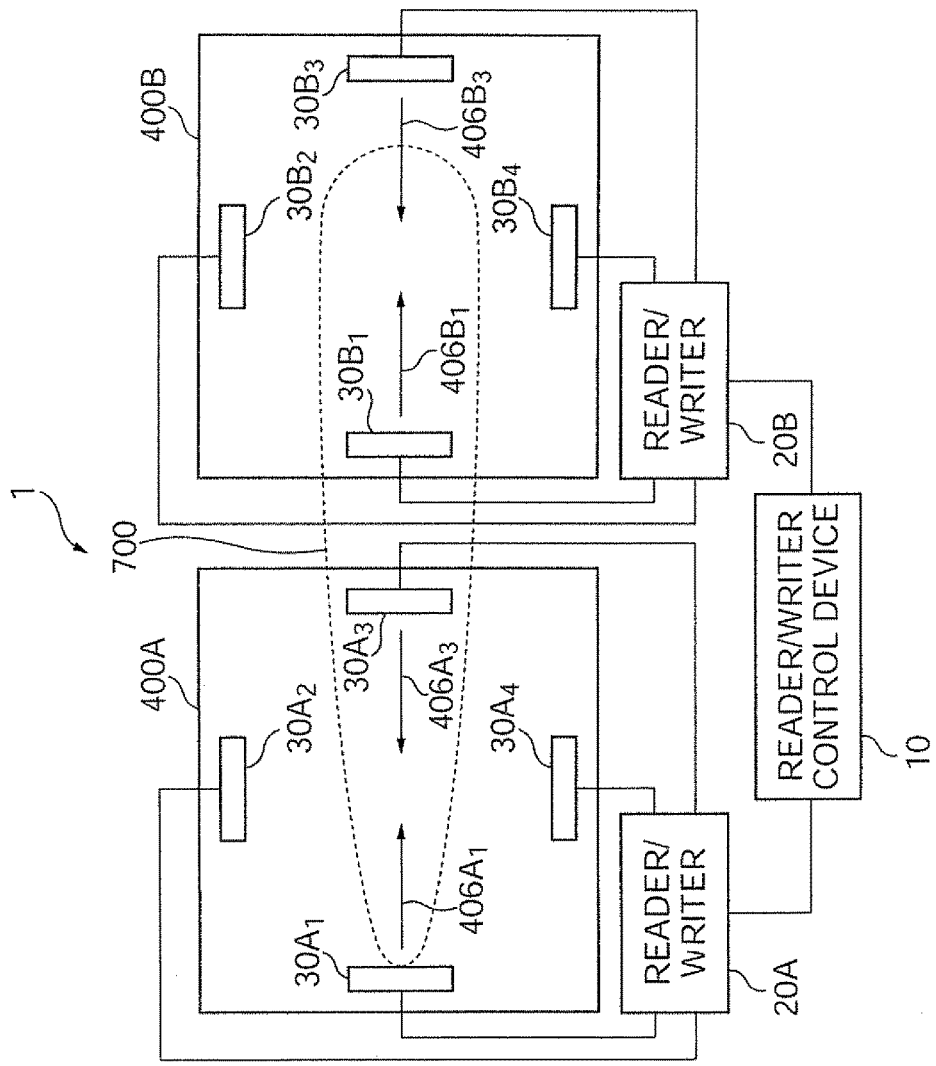

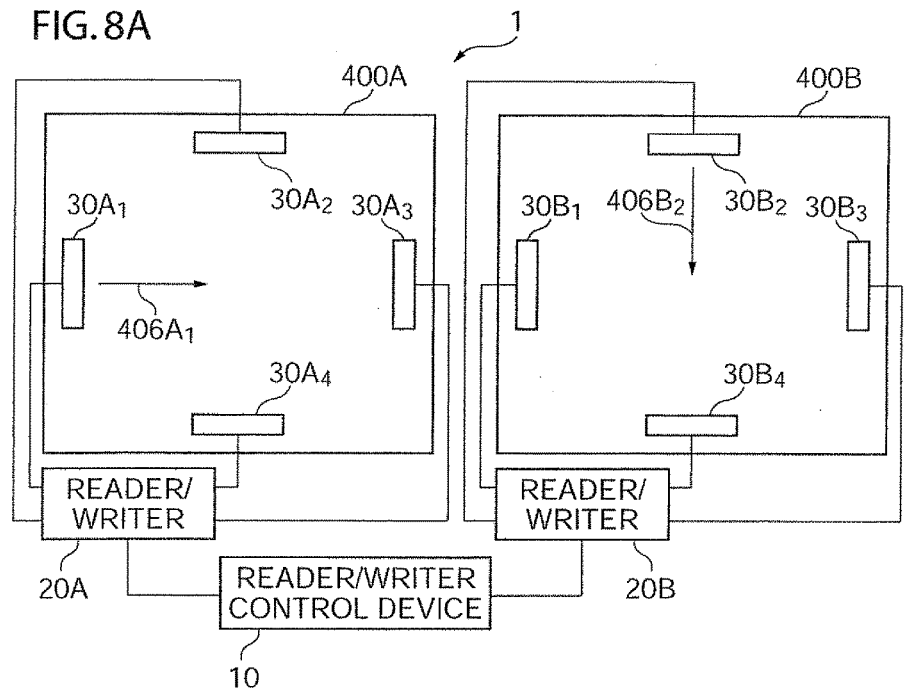
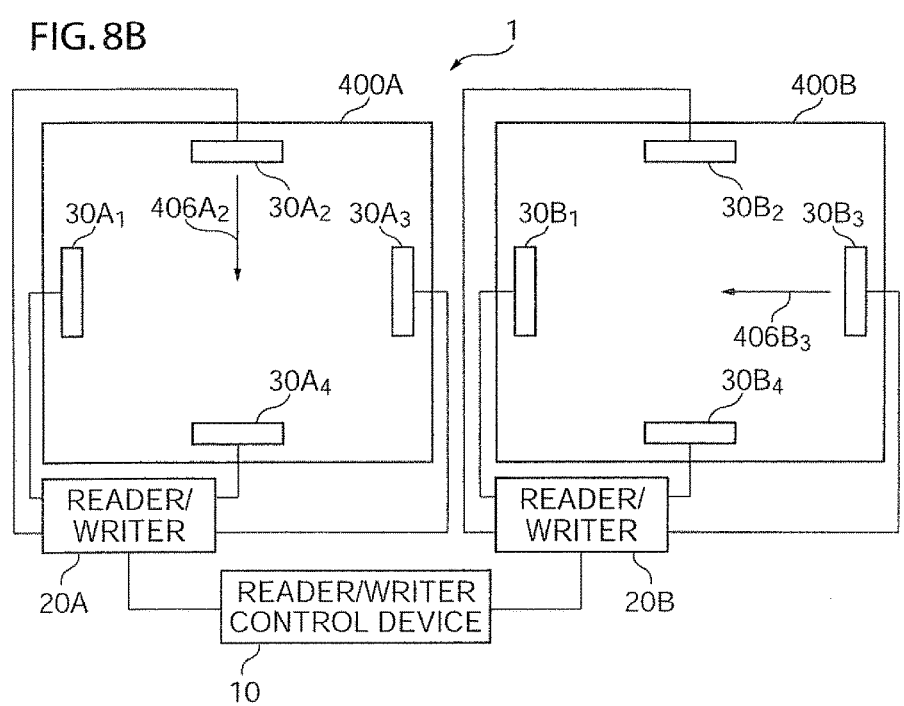

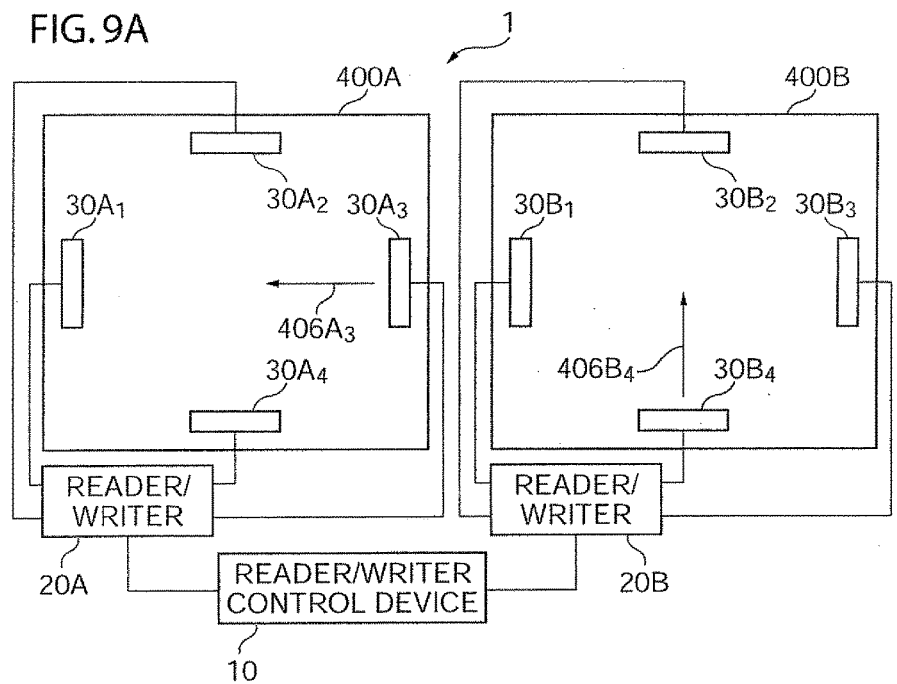
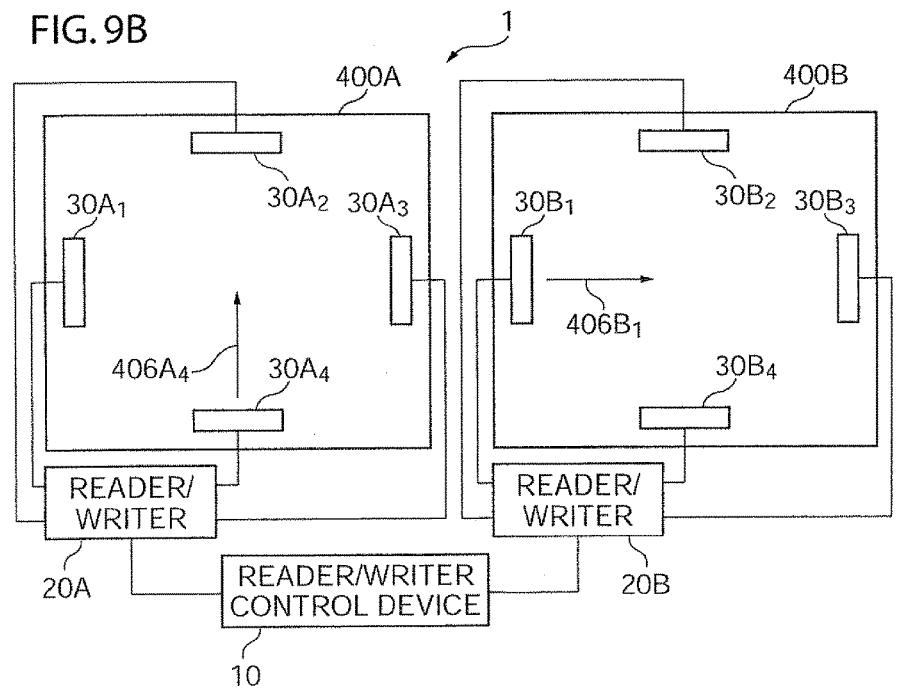

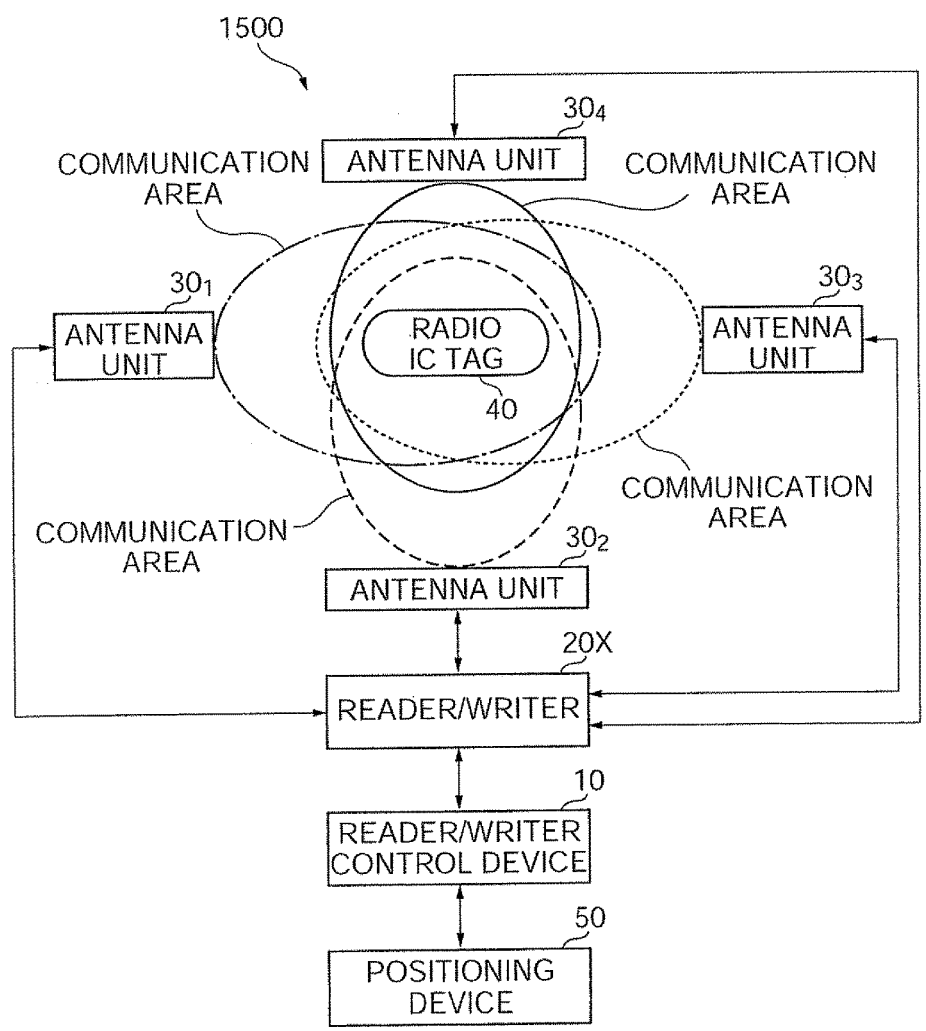

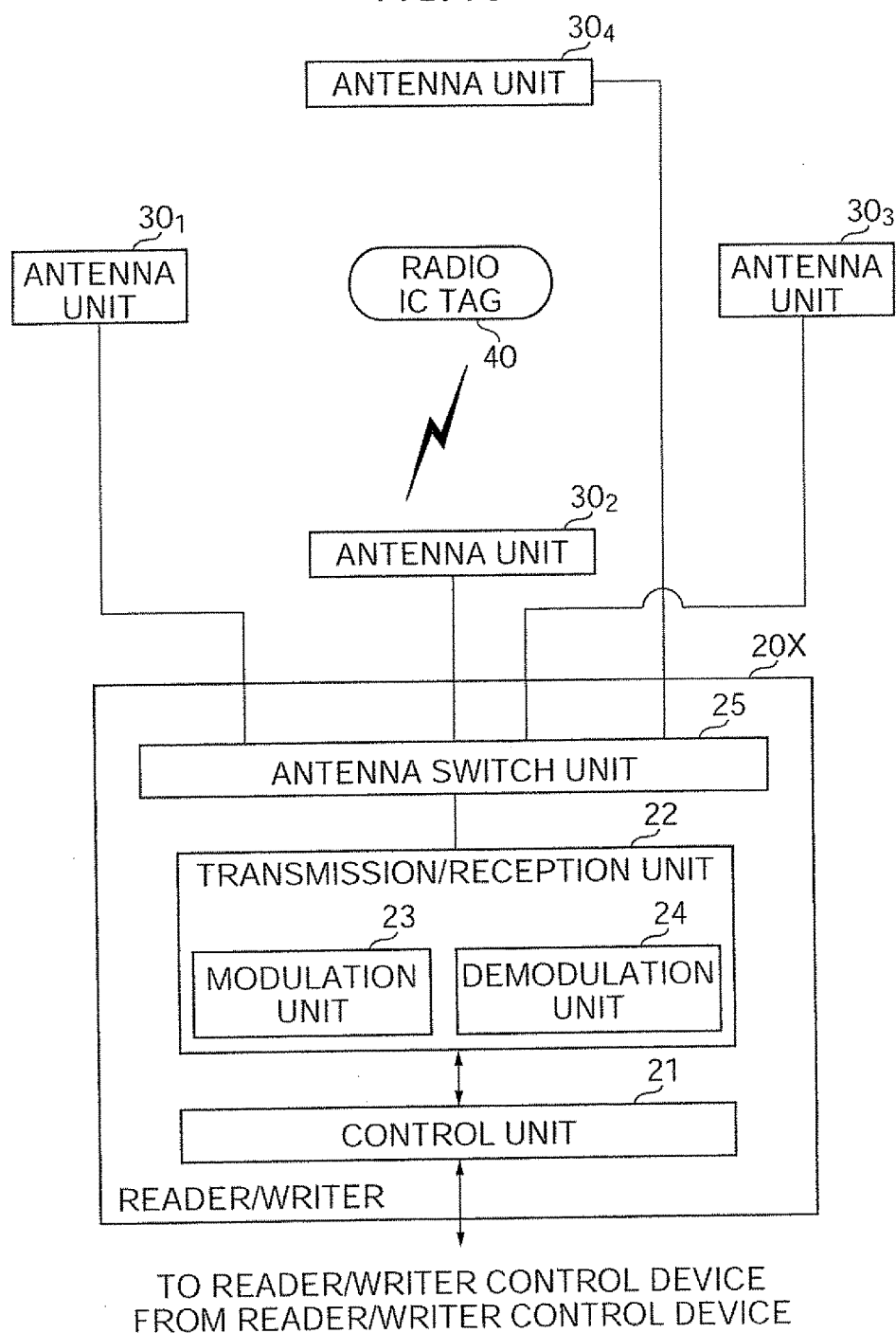

FIG.18

| SPECIFIC ID FIELD 1802 | VERTICAL POLARIZATION 1803 | HORIZONTAL POLARIZATION 1804 | CLOCKWISE CIRCULAR POLARIZATION 1805 | COUNTERCLOCKWISE CIRCULAR POLARIZATION 1806 | EVALUATED RADIO WAVE INTENSITY 1807 | ESTIMATED DISTANCE FIELD 1808 |
|---|---|---|---|---|---|---|
| 10001 | 34 | 10 | 22 | 18 | 34 | 22 |
| 10002 | 6 | 44 | 12 | 26 | 44 | 15 |
| 10003 | 55 | 3 | 24 | 34 | 55 | 11 |
| ...... | ...... | ...... | ...... | ...... | ...... | ...... |
| 10100 | 12 | 8 | 4 | 72 | 72 | 3 |

FIG.20

| SPECIFIC ID 2002 | FIRST ESTIMATED DISTANCE 2003 | SECOND ESTIMATED DISTANCE 2004 | ESTIMATED POSITION 2005 |
|---|---|---|---|
| 10001 | 34 | 335 | (○○○, ×××) |
| 10002 | 44 | 400 | (▲▲▲, □□□) |
| 10003 | 55 | 450 | (☆☆☆, ○○○) |
| ...... | ...... | ...... | ...... |
| 10100 | 72 | 210 | (△△△, ◎◎◎) |

| | SPECIFIC ID | CHANNEL 1 | CHANNEL 2 | ..... | CHANNEL 9 | EVALUATED RADIO WAVE INTENSITY | ESTIMATED DISTANCE |
|---|---|---|---|---|---|---|---|
| | 10001 | 12 | 24 | ....... | 34 | 34 | 16 |
| | 10002 | 6 | 2 | ....... | 12 | 12 | 34 |
| | 10003 | 55 | 3 | ....... | 22 | 55 | 8 |
| | ....... | ....... | ....... | ....... | ....... | ....... | ....... |
| | 10100 | 10 | 8 | ....... | 72 | 72 | 3 |

FIG.26

| SPECIFIC ID | FIRST | SECOND | THIRD | ..... | 100TH | SUCCESSFUL FREQUENCY | ESTIMATED DISTANCE |
|---|---|---|---|---|---|---|---|
| 10001 | 1 | 1 | 1 | ..... | 1 | 89 | 5 |
| 10002 | 0 | 0 | 1 | ..... | 0 | 22 | 24 |
| 10003 | 1 | 1 | 1 | ..... | 1 | 100 | 0 |
| ...... | ...... | ...... | ...... | ..... | ...... | ...... | ...... |
| 10100 | 1 | 0 | 0 | ..... | 1 | 51 | 14 |

FIG.28

| SPECIFIC ID | FIRST ESTIMATED DISTANCE | SECOND ESTIMATED DISTANCE | ESTIMATED POSITION (COORDINATES) |
|---|---|---|---|
| 10001 | 88 | 335 | (○○○, ×××) |
| 10002 | 22 | 400 | (▲▲▲, □□□) |
| 10003 | 100 | 450 | (☆☆☆, ○○○) |
| ...... | ...... | ...... | ...... |
| 10100 | 50 | 210 | (△△△, ◎◎◎) |

DATA READER AND POSITIONING SYSTEM

The present disclosure relates to subject matters contained in Japanese Patent Application No. 2005-293984 filed on Oct. 6, 2005, Japanese Patent Application No. 2006-209923 filed on Aug. 1, 2006, Japanese Patent Application No. 2006-132809 filed on May 11, 2006, Japanese Patent Application No. 2006-132810 filed on May 11, 2006, and Japanese Patent Application No. 2006-39527 filed on Feb. 16, 2006, which are expressly incorporated herein by reference in its entireties.

BACKGROUND OF THE INVENTION

1. Field of the Invention

The present invention relates to a data reader and a positioning system, and more specifically to a data reader for reading data from a storage medium from which data can be read by radio waves such as a RFID tag, a radio IC tag, etc., and positioning system using the data reader.

2. Description of the Prior Art

With the development of the recent radio communication technology and information processing technology, the management of articles by storing various kinds of information in a storage medium called a radio IC tag, and reading the information by radio waves has been developed. As an example of the technology, a data read system for management of hooks by assigning an IC tag storing the name or the code of a book to a book in a library, and reading it by a reader mounted near a bookshelf is disclosed in, for example, Japanese Patent Laid-Open No. 10-334198.

In the above-mentioned data read system, there can be the case where it is difficult or impossible to read data in its environment even in the range of the radio waves for a read that are radiated by a reader depending on the area or the position because reflected wave as radio waves for a read reflected by a wall, an article, etc. and direct waves of the radio waves for a read indicate inverse phases and interfere with one another in a certain point. In a point where the interference occurs, a radio IC tag cannot receive radio waves for a read from a reader. As a result, a data read from the radio IC tag fails.

When a plurality of readers and a plurality of antennas for readers are provided, the radio waves for a read radiated from each antenna interfere with one another, and in a point where the above-mentioned interference occurs, a data read from a radio IC tag fails.

The advantage of the present invention is to provide a data reader capable of changing an occurrence position of a dead spot (null point) as a point/area where it is difficult or impossible to read data due to the interference of radio waves for a read radiated from a data reader, and reading data regardless of a position of a radio IC tag.

SUMMARY OF THE INVENTION

As means for solving the above-mentioned problem, the present invention has the following features.

A data reader according to the present invention is proposed as a data reader for reading data in a separate position from a storage medium (for example, a radio IC tag) provided with a storage unit for storing data and a communicating antenna for transmitting data stored in the storage unit.

The data reader includes a plurality of antenna units for transmitting and receiving data with a storage medium; and a control unit (for example, a reader/writer or a reader/writer control device) connected to each antenna unit, wherein each antenna unit can change radiation characteristics (for example, an electric field pattern, a beam direction, a beam width, etc.) in accordance with the control unit.

According to the data reader, an occurrence of a dead spot due to a direct wave, reflected wave, etc. can be avoided by changing the radiation characteristic of antenna means, or a read disabled status due to a dead spot can be avoided by changing an occurrence position regardless of location of a storage medium, thereby performing a data read without failing in reading any data.

The above-mentioned data reader can further have the following feature. That is, the control unit changes the directivity of each antenna unit in conjunction with the directivities of other antenna units.

With the data reader, the radio wave radiated from another antenna means does not interfere with the weak radio wave transmitted from a storage medium, thereby performing a data read without failing in reading any data (without an occurrence of a read error of a radio IC tag) regardless of the location of a storage medium.

The data reader can further have the following feature. That is, in the data reader, the control unit changes the direction of the radio waves radiated from the antenna units by sequentially driving the plurality of the antenna units.

With the data reader, in the case of radiation of radio wave for a data read from a plurality of antenna units, the radio wave radiated from another antenna units does not interfere with the weak radio wave transmitted from a storage medium, thereby performing a data read without failing in reading any data regardless of the location of a storage medium.

The above-mentioned data reader can further have the following feature. That is, when two or more of the plurality of the antenna units are simultaneously driven, the control unit control such that the beam direction of each of the simultaneously driven antenna units is different from the direction of other antenna units.

With the data reader, in the case of radiation of radio wave for a data read from a plurality of antenna means, the radio wave radiated from another antenna means does not interfere with the weak radio wave transmitted from a storage medium, thereby performing a data read without failing in reading any data regardless of the location of a storage medium.

The second aspect of the present invention is proposed as a data reader for reading data in a separate position from storage mediums (for example, a radio IC tags) each having a storage unit for storing data and a communicating antenna for transmitting data stored in the storage unit.

The data reader is proposed as including control means (for example, a reader/writer) for generating a modulated signal by modulating a carrier wave and providing the generated modulated signal for the antenna means, and a plurality of antenna means (for example, an antenna unit) for transmitting radio waves for a read for transmitting/receiving data with a storage medium by radiating the modulated signal into the air, in which the control means includes a phase adjustment means (for example, phase adjustment circuit) for changing the phase of the carrier wave.

With the data reader, an occurrence position of a dead spot can be changed by changing the phase of a carrier wave. As a result, although there is a radio IC tag temporarily located in a dead spot, the dead spot can be removed after the change of the phase, thereby avoiding a read disabled status, and performing a data read without failing in reading any data.

The data reader can have the following feature. That is, the phase adjustment unit can stepwise change (for example, by π/2) the phase of a carrier wave. With the data reader, an occurrence position of a dead spot can be changed by stepwise changing the phase of a carrier wave. As a result, although there is a radio IC tag temporarily located in a dead spot, the dead spot can be removed after the change of the phase, thereby avoiding a read disabled status, and performing a data read without failing in reading any data. The phase can be changed by a predetermined amount (for example, by π/2).

With the data reader, although there is currently a radio IC tag located in a dead spot, the dead spot can be removed by changing the phase, thereby reading data without failing in reading any data (without an occurrence of a read error of a radio IC tag) regardless of the location of a storage medium.

The third aspect of the present invention is proposed as a positioning system as a system for designating a position of a storage medium by reading storage medium such as a radio IC tag, etc.

The positioning system includes: a plurality of antenna units for reading data from storage mediums for example, a radio IC tag) each having a storage unit for storing data (for example, a specific ID) and a communicating antenna for transmission of the data stored in the storage unit, by using radio waves having different polarization directions (for example, vertical polarization, horizontal polarization, clockwise circular polarization, counterclockwise circular polarization, etc.);

a control unit (for example, a reader/writer or a reader/writer control device) connected to the antenna units, for controlling the antenna units such that radiation characteristics (for example, an electric field pattern, a beam direction, a beam width, etc.) of the antenna units are changed; and a positioning unit (for example, a positioning device) for calculating the position of each storage medium on the basis of strengths of signals, the strengths of the signals being obtained as a result of read operations of the data stored in the storage mediums, by using radio waves having different polarization directions, while having the antenna units change their radiation characteristics.

With the positioning system, a storage medium such as a radio IC tag, etc. is read by radio waves having different polarization directions while changing the radiation characteristic of the antenna means, thereby receiving radio waves for a read with sufficient radio wave strength for a radio IC tag, steadily reading a radio IC tag, and designating the position although the radio IC tag is located in a so-called dead spot, or regardless of the direction of the radio IC tag, or to more specifically, its antenna.

The fourth aspect of the present invention is proposed as a positioning system for designating the position of a storage medium by reading a storage medium such as a radio IC tag.

The positioning system includes: a plurality of antenna units for reading data from storage mediums each having a storage unit for storing data, and a communicating antenna for transmission of the data stored in the storage unit, by using radio waves having different center frequencies (for example, a channel when an assigned frequency band is divided into plural portions); a control unit (for example, a reader/writer or a reader/writer control device) connected to the antenna units, for controlling the antenna units such that radiation characteristics (for example, an electric field pattern, a beam direction, a beam width, etc.) of the antenna units can be changed; and a positioning unit (for example, a positioning device) for calculating the position of each storage medium on the basis of strengths of signals, the strengths of the signals being obtained as a result of read operation of the data of the storage mediums, by using radio waves having different central frequencies, while having the antenna units change their radiation characteristics.

With the positioning system, by using the radio wave having different center frequencies while changing the radiation characteristic of the antenna means, although a radio IC tag is located in a dead spot using radio waves of a center frequency, it is not located in a dead spot by the difference in wavelength when radio waves having another center frequency are used. As a result, radio waves for a read can be received with sufficient radio wave strength for a radio IC tag, thereby steadily reading a radio IC tag, and designating the position.

The fifth aspect of the present invention is a combination of the third and fourth aspects, and is proposed as a positioning system for designating the position of a storage medium by reading a storage medium such as a radio IC tag, etc.

The positioning system includes: a plurality of antenna units for reading data (for example, a specific ID) from storage mediums (for example, radio IC tag) each having a storage unit for storing data and a communicating antenna for transmission of the data stored in the storage unit, by using radio waves having different polarization directions for example, vertical polarization, horizontal polarization, clockwise circular polarization, counterclockwise circular polarization, etc.) and center frequencies (for example, a channel when an assigned frequency band is divided into plural portions); a control unit (for example, a reader/writer or a reader/writer control device) connected to the antenna units, for controlling the antenna units such that radiation characteristics (for example, an electric field pattern, a beam direction, a beam width, etc.) of the antenna units can be changed; and a positioning unit (for example, a positioning device) for calculating the position of each storage medium on the basis of strengths of signals, the strengths of the signals being obtained as a result of read operation of the data stored in the storage mediums by using radio waves having different polarization directions and different central frequencies, while having the antenna units change their radiation characteristics.

With the positioning system, a storage medium such as a radio IC tag, etc. is read by radio waves having different polarization directions and center frequency while changing the radiation characteristic of the antenna means, thereby receiving radio waves for a read with sufficient radio wave strength for a radio IC tag, steadily reading a radio IC tag, and designating the position although the radio IC tag is located in a so-called dead spot, or regardless of the direction of the radio IC tag, or to more specifically, its antenna.

The sixth aspect of the present invention is proposed as a positioning system for designating the position of a storage medium such as a radio IC tag, etc. by reading the storage medium.

The positioning system includes: a plurality of antenna units for reading data (for example, a specific ID) from storage mediums (for example, a radio IC tag) each having a storage unit for storing data and a communicating antenna for transmission of the data stored in the storage unit;

a control unit (for example, a reader/writer or a reader/writer control device) connected to the antenna units, for controlling the antenna units such that radiation characteristics (for example, an electric field pattern, a beam direction, a beam width, etc.) of the antenna units can be changed; and a positioning unit (for example, a positioning device) for calculating the position of each storage medium by using the number of succeeded read operations which is obtained by having the antenna units read the storage mediums in plural times, while having the antenna units change their radiation characteristics.

With the positioning system, the position of a storage medium can be designated by removing a read error of a storage medium by the dead spot without an influence of the fluctuation of the strength of a radio wave from a storage medium by the passage of an obstacle.

In the above-mentioned positioning system, the positioning means can further record the intensity of a signal received from each storage medium when a read is successfully performed on each storage medium, and calculate the position of a storage medium using the intensity of the signal together with the number of successful reads.

BRIEF DESCRIPTION OF THE DRAWINGS

FIG. 5 is a graph showing the relationship between the distance from an antenna unit and the electric field intensity of a radio wave radiated by the antenna unit;

FIG. 6 shows an example of the data reader 1 in which four antenna units are provided in two adjacent spaces;

FIG. 7 shows an example of an occurrence of read interference by a direct wave from an adjacent reader/writer in the arrangement shown in FIG. 6;

FIG. 8A shows an example of an operation of the data reader 1;

FIG. 8B shows an example of an operation of the data reader 1 after the operation shown in FIG. 8A;

FIG. 9A shows an example of an operation of the data reader 1 after the operation shown in FIG. 8B;

FIG. 9B shows an example of an operation of the data reader 1 after the operation shown in FIG. 9A;

FIG. 15 is a block diagram showing an example of the configuration of the positioning system according to the third embodiment;

FIG. 16 is a block diagram showing the function of an example of the configuration of the reader/writer according to the third embodiment;

FIG. 18 shows an example of the read result data stored in the read result storage unit;

FIG. 20 shows an example of a table storing the result of the position calculation unit calculating the estimated position of the radio IC tag based on the estimated distance calculated from the evaluated radio wave intensity;

FIG. 24 shows an example of data stored in the read result storage unit according to the fourth embodiment;

FIG. 26 shows an example of the read result data stored in the read result storage unit;

FIG. 28 shows an example of a table storing the result of the position calculation unit calculating the estimated position of the radio IC tag 40 based on the estimated distance calculated from the number of successful reads.

The accompanying drawings, which are incorporated in and constitute apart of the specification, illustrate embodiments of the invention, and together with the general description given above and the detailed description of the embodiments given below, serve to explain the principles of the invention.

DESCRIPTION OF THE PREFERRED EMBODIMENTS

The embodiments according to the present invention are described below in detail by referring to the attached drawings.

A. First Embodiment

[A.1. Basic Configuration]

The data reader according to the first embodiment is described below by referring to the attached drawings. First, an example of the basic configuration of the data reader according to an embodiment is explained below.

Figure 1:
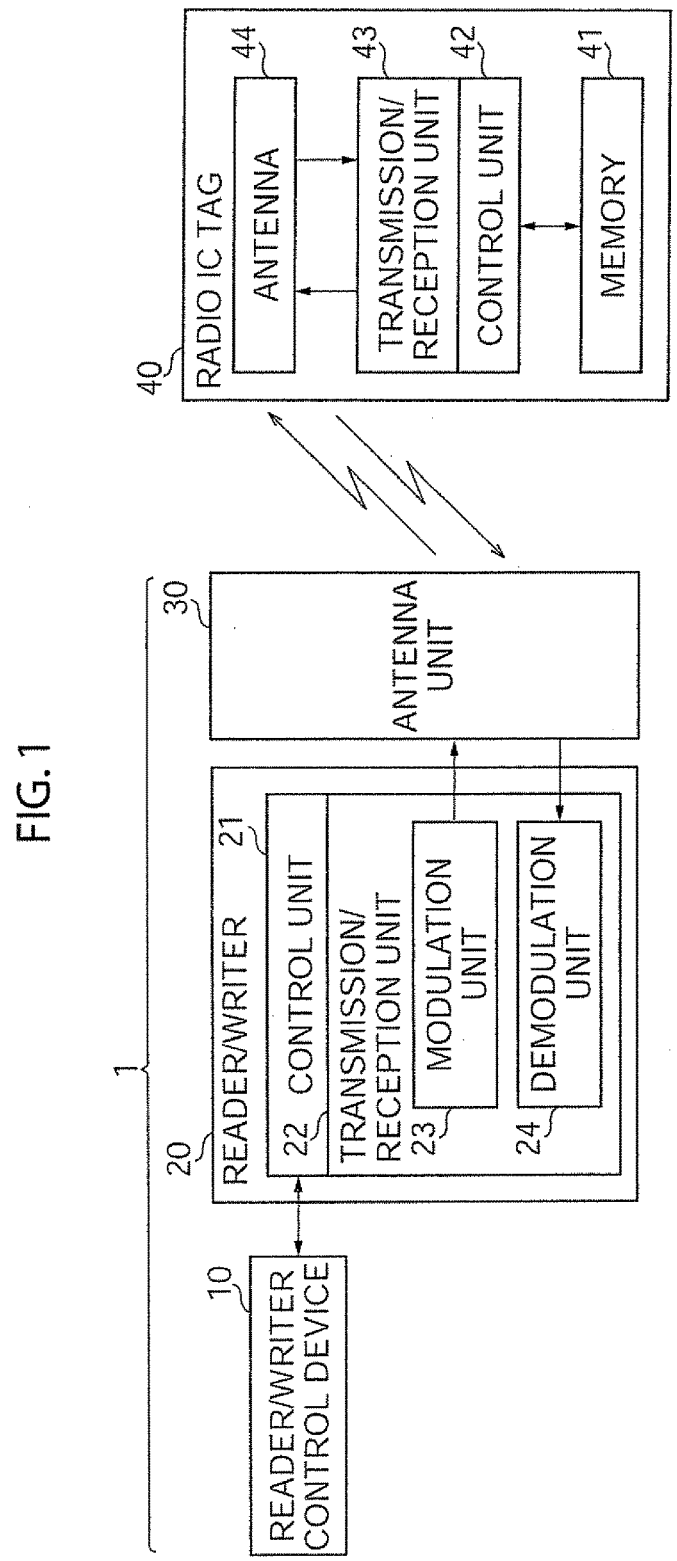
FIG. 1 is a block diagram showing the function of an example of the basic configuration of the data reader.

FIG. 1 is a block diagram showing the function of an example of the basic configuration of the data reader.

A data reader 1 is constituted by a reader/writer control device 10, a reader/writer 20 connected to the reader/writer control device 10, and an antenna unit 30 connected to the reader/writer 20.

The reader/writer control device 10 instructs the reader/writer 20 to perform a reading operation and transmit the data read from a radio IC tag 40 to the reader/writer 20, stores data received from the reader/writer 20, and performs predetermined information processing (for example, displaying an inventory list, etc.). The reader/writer control device 10 can be, for example, a computer, various controllers, etc.

The reader/writer 20 includes a control unit 21 and a transmission/reception unit 22 connected to the control unit 21. The control unit 21 receives an instruction from the reader/writer control device 10, drives the transmission/reception unit 22 at the instruction, and transmits the data (read from the radio IC tag 40) output from the transmission/reception unit 22 to the reader/writer control device 10.

The transmission/reception unit 22 has the function of communicating data with the radio IC tag 40 through the antenna unit 30. The transmission/reception unit 22 has a modulation unit 23 and a demodulation unit 24. The modulation unit 23 modulates a carrier wave in a predetermined modulation system according to the information such as a predetermined command, request, instruction, etc. received from the control unit 21, generates a modulated carrier wave (modulated signal) modulated, and provides it for the antenna unit 30. The demodulation unit 24 demodulates a modulated signal modulated in a predetermined modulation system according to the signal depending on the data stored in the radio IC tag 40, retrieves a signal depending on the data, and transmits it to the control unit 21.

The antenna unit 30 radiates a modulated carrier wave received from the reader/writer 20, more specifically the modulation unit 23, into the air, radiates radio waves to the radio IC tag 40, receives a modulated signal radiated from the radio IC tag, and provides the modulated signal for the reader/writer 20, more specifically the demodulation unit 24. The antenna unit 30 is constituted by a transmitting antenna and a receiving antenna (not shown in the attached drawings) and a case (not shown in the attached drawings) for protecting the antennas. The antenna unit 30 is separated from the reader/writer 20, and connected to the reader/writer 20 via a cable, etc. Therefore, the antenna unit 30 can be mounted in a place distant from the reader/writer 20. In another configuration example, one of a plurality of antenna units 30 connected to the reader/writer 20 can be incorporated into the reader/writer 20.

The radio IC tag 40 includes memory 41, a control unit 42, a transmission/reception unit 43, and an antenna 44. The memory 41 is a storage device storing information to be read such as an identification code about goods information, sender information, etc. The control unit 42 interprets a command, a request, an instruction, etc. from the reader/writer 20, and performs a corresponding operation. The transmission/reception unit 43 includes a modulation unit and a demodulation unit (not shown in the attached drawings) as with the reader/writer 20, and modulates/demodulates a signal to communicate data with the reader/writer 20. The antenna 44 receives a modulated signal from the reader/writer 20, supplies it to the transmission/reception unit 43, receives a modulated wave from the transmission/reception unit 43, and radiates it into the air to allow the reader/writer 20 to receive the wave.

The data reader 1 can be constituted by a plurality of antenna units 30 and switch and use a plurality of antenna units 30.

Figure 2:
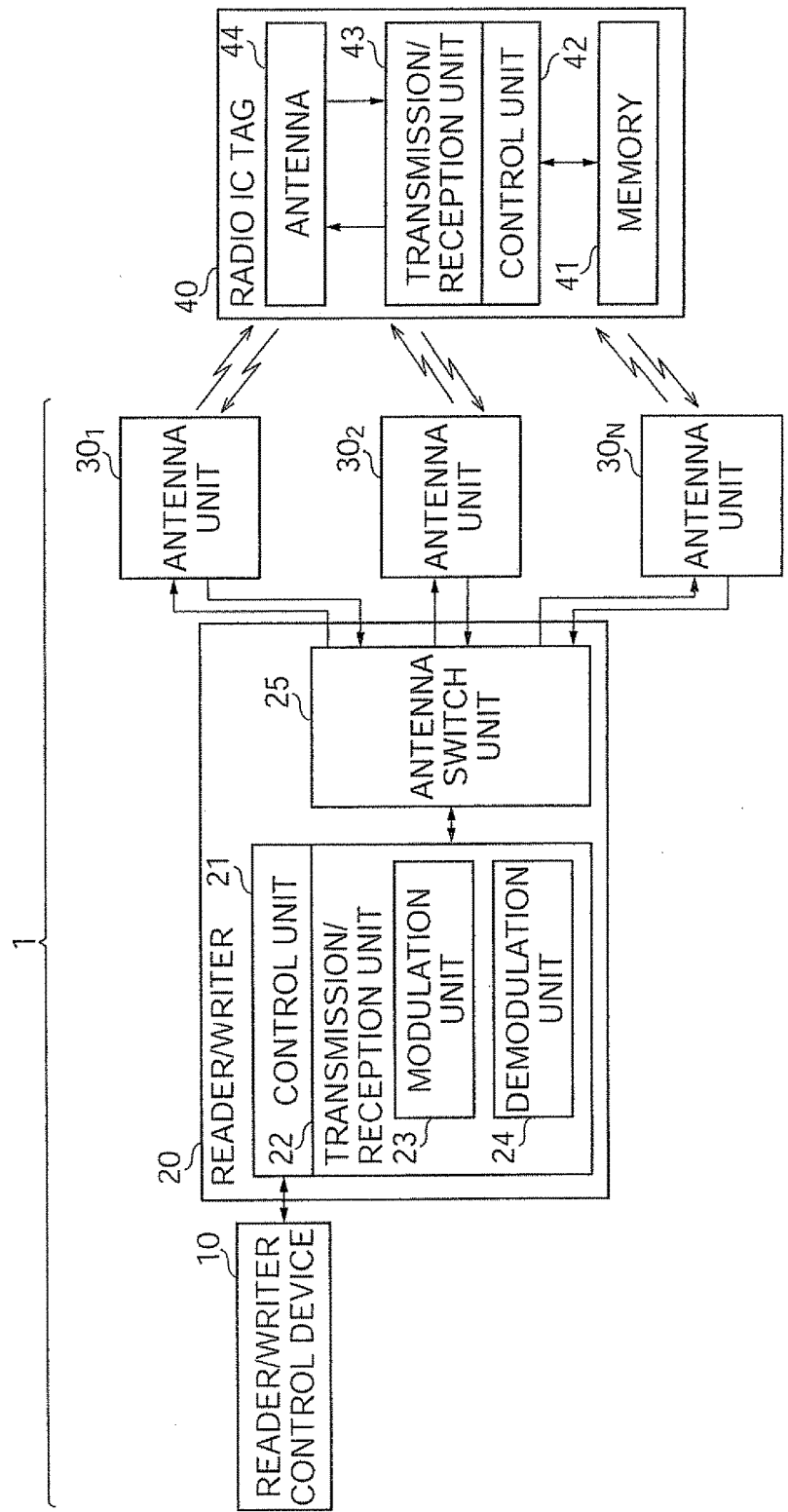
FIG. 2 is a block diagram showing the function of an example of the configuration of a data reader 1 having a plurality of antenna units.

FIG. 2 is a block diagram showing the function of an example of the configuration of the data reader 1 having a plurality of antenna units 30. In the data reader 1, N antenna units $30_1$, $30_2$, ..., $30_N$ are connected to the reader/writer 20. The reader/writer 20 further includes an antenna switch unit 25, the antenna switch unit 25 selectively connects N antenna units $30_1$, $30_2$, ..., $30_N$ to the transmission/reception unit 22 under the control of the control unit 21, and communicates data with the radio IC tag 40 using the desired antenna unit 30. In FIG. 2, the same devices and components as those shown in FIG. 1 are assigned the same reference numerals as those shown in FIG. 1, and the explanation is omitted here.

Figure 3:
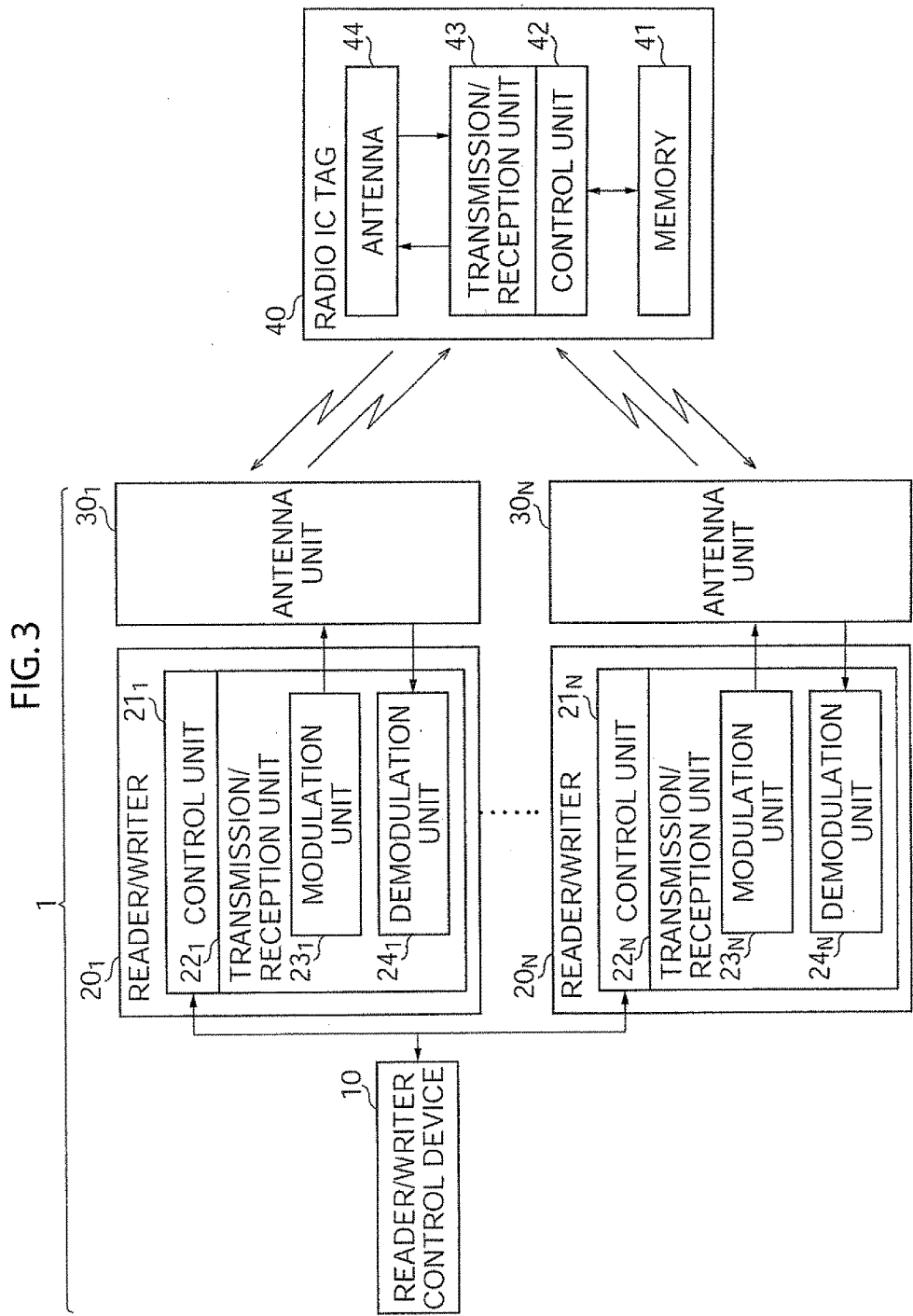
FIG. 3 is a block diagram showing the function of an example of the configuration of a data reader 1 having a plurality of readers/writers and antenna units.

FIG. 3 is a block diagram showing the function of an example of the configuration of a data reader 1 having a plurality of readers/writers 20 and antenna units 30. In the data reader 1, N reader/writer $20_1$, ..., $20_N$ are connected to the reader/writer control device 10, and N antenna units $30_1$, ..., $30_N$ are connected to the corresponding reader/writers $20_1$, ..., $20_N$. The reader/writer control device 10 can control the reader/writers $20_1$, ..., $20_N$, such that the reader/writers $20_1$, ..., $20_N$ can be independently operated. As a result, the data reader 1 selectively transmits an instruction to the reader/writers $20_1$, ..., $20_N$, thereby selecting a desired antenna unit 30 from the N antenna units $30_1$, $30_2$, ..., $30_N$, and communicating the data with the radio IC tag 40. In FIG. 3, the same devices and components as those shown in FIG. 1 are assigned the same reference numerals as those shown in FIG. 1, and the explanation is omitted here.

[A.2. Occurrence and Removal of a Dead Spot]

The read disabled or difficult point/area (hereinafter referred to as a dead spot) occurring by the interference with radio waves for a read depending on an environment condition when the data reader 1 is used is explained below.

Figure 4A:
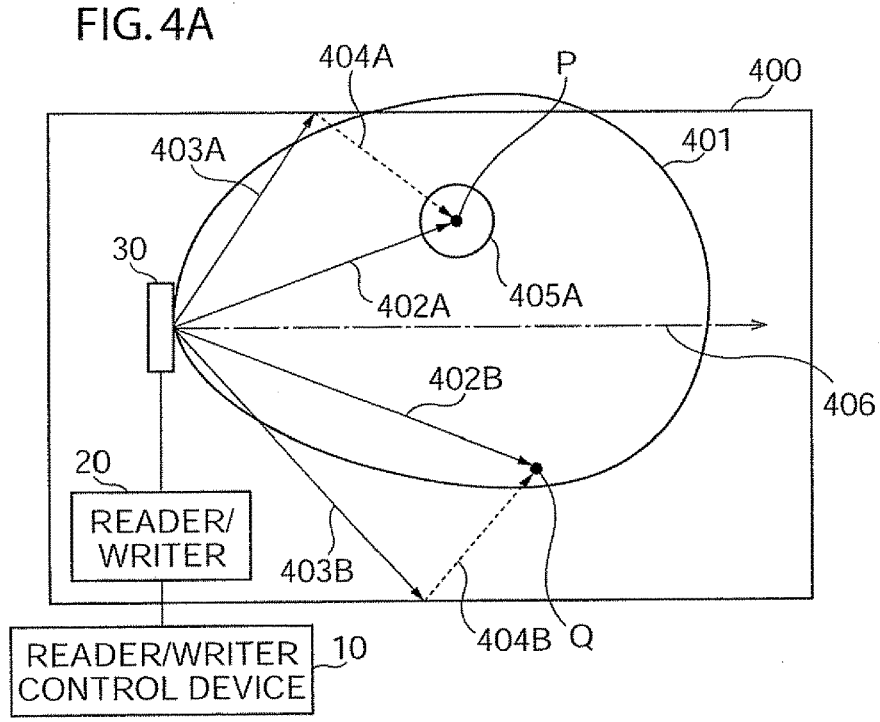
FIG. 4A shows an electric field pattern and a dead spot when a reader/writer and an antenna unit are arranged in a closed space.

FIG. 4A shows an electric field pattern and a dead spot when a reader/writer 20 and an antenna unit 30 are arranged in a closed space (for example, a warehouse, a room in a building, etc.) 400. The antenna unit which receives a modulated carrier wave from the reader/writer 20 radiates radio waves into the air. The antenna (not shown in FIG. 4A) stored in the antenna unit 30 has a specific radiation of a direction characteristic, and the direction characteristic in the horizontal direction is shown as an electric field pattern 401. The beam direction of the antenna unit 30 is indicated by an arrow mark 406.

The radio wave radiated from the antenna unit 30 is radiated toward various directions. At the point P in the space 400, the direct wave 402A as radio wave directly received from the antenna unit 30 is received, and a reflected wave 404A which is generated by another direct wave 403A transmitted to the wall in the space 400 from the antenna unit 30 is also received. At this time, the reflected wave 404A reaches the position P in the status having sufficient electric field intensity. Therefore, the direct wave 402A and the reflected wave 404A are opposite in phase depending on the relationship between the wavelength of radio wave and the travel distance of the direct wave 402A and the reflected wave 404A, thereby deleting each other and generating a dead spot 405A around the position P.

On the other hand, in the position Q as another point in the space 400, the direct wave 402B as radio wave directly received from the antenna unit 30 is received in the position Q, and a reflected wave 404B which is generated by another direct wave 403B transmitted to the wall in the space 400 from the antenna unit 30 is received in the position Q. However, the electric field intensity of the other direct wave 403B is weak, and therefore the electric field intensity of the reflected wave 404B is also weak. As a result, although the direct wave 402B and the reflected wave 404B are opposite in phase in the position Q, the direct wave 402B is not removed, and there is no dead spot around the position Q.

In FIG. 4A, only one dead spot 405A is shown, but dead spots can occur at plural points. When the radio IC tag 40 is located at the dead spot 405A, the radio IC tag 40 cannot communicate with the reader/writer 20. As a result, the reader/writer 20 cannot read data in the radio IC tag 40 located in a dead spot 405.

FIG. 5 is a graph showing the relationship between the distance from the antenna unit 30 and the electric field intensity of the radio wave radiated by the antenna unit under a condition. In FIG. 5, a curve 501 indicates the electric field intensity when it is assumed that there is no occurrence of a dead spot. A curve 502 indicates the electric field intensity when it is assumed that there is an occurrence of a dead spot. A straight line 503 indicates the minimum electric field intensity of the radio wave that can be received by the radio IC tag 40.

When it is assumed that there is no occurrence of a dead spot, the electric field intensity moderately falls as the distance from the antenna unit 30 increases. On the other hand, since a dead spot practically occurs, a change of the electric field intensity such as the curve 502 occurs. In this case, since an area 504 is an area of radio wave exceeding the minimum electric field intensity indicated by the straight line 503, the reader/writer 20 must read data from the radio IC tag 40. However, practically, as shown by the curve 502, the electric field intensity of the radio wave received by the radio IC tag 40 falls below the minimum electric field intensity indicated by the straight line 503. Therefore, it is the area where data cannot be read from the radio IC tag 40. That is, the area 504 is a dead spot.

Figure 4B:
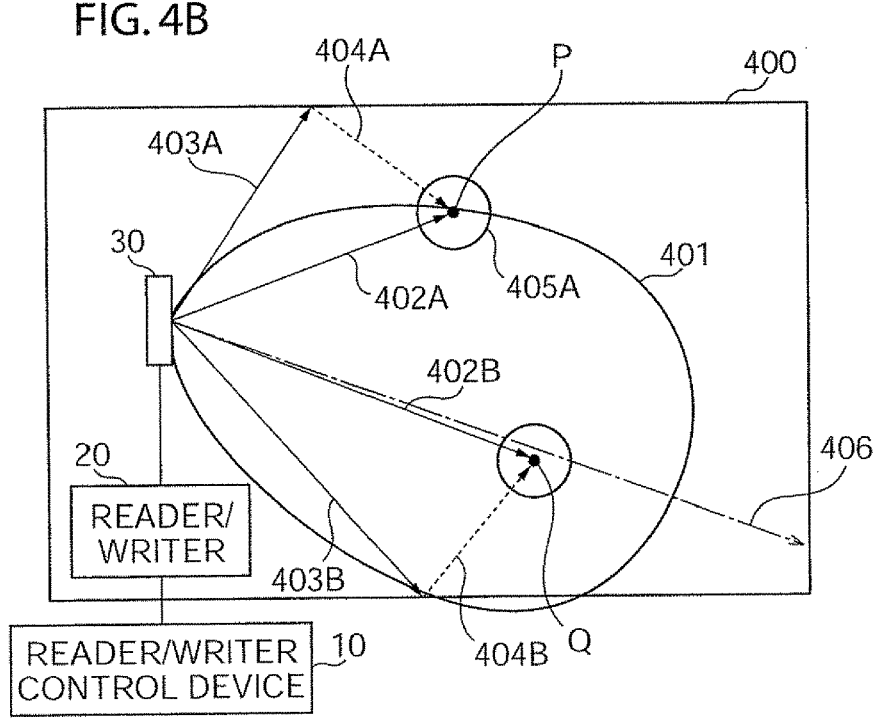
FIG. 4B shows an electric field pattern and a dead spot after the radiation characteristic of an antenna is changed.

FIG. 4B shows the status in which the radiation characteristic of the antenna unit 30 is changed to remove the dead spot 405A generated in the status shown in FIG. 4A. The antenna loaded into the antenna unit 30 is an antenna capable of changing the radiation characteristic by the control of the reader/writer control device 10, for example, a phased array antenna.

In the example shown in FIG. 4B, the beam direction 406 and the electric field pattern 401 have been changed by changing the radiation characteristic of the antenna. Since the electric field pattern 401 is changed, the electric field intensity of the reflected wave received at the positions P and Q is also changed. That is, the electric field intensity of the reflected wave 404A received at the position P becomes weak, and the electric field intensity of the reflected wave 404B received at the position Q becomes strength. As a result, in this example, the dead spot 405A around the position P annihilates, but a new dead spot 405B is generated around the position Q.

Although the radio IC tag 40 located at the position P cannot be read in the status shown in FIG. 4A, it can be read in the status shown in FIG. 4B after the radiation characteristic of the antenna unit is changed.

The data reader 1 according to the embodiment can perform the reading process on the radio IC tag 40 while avoiding the read disabled status at the dead spot 405 by performing the reading process on the radio IC tag 40 while changing the radiation characteristic of the antenna, for example, as shown in FIGS. 4A and 4B.

The data reader 1 can be constituted such that two or more antenna units 30 can be sequentially or simultaneously driven as a variation. As the condition at this time, the reader/writer control device 10 can be designed to drive and control the antenna unit 30 such that the radiation characteristic (beam direction, beam width, etc.) of each antenna can be changed to avoid the overlapping electric field patterns of the antenna unit 30 or minimize the overlapping area.

[A.3. Preventing an Occurrence of Interference by Direct Wave]

A plurality of antennas can be used in reading the radio IC tag 40. In reading the radio IC tag 40 in a large area such as a warehouser etc., the large area can be divided into small segments due to an efficient communication distance, the plural antennas are provided for each of the small segments, and then the radio IC tag 40 can be read. Also when an article provided with the radio IC tag 40 is stored in a plurality of rooms, the plural antennas are provided for each room and the radio IC tag 40 is read.

FIG. 6 shows an example of the data reader 1 in which four antenna units $30A_1$~$30A_4$, $30B_1$~$30B_4$ are provided in two adjacent spaces 400A and 4002 (corresponding to small segments and rooms). The antenna units $30A_1$~$30A_4$, $30B_1$~$30B_4$ are connected to the reader/writers 20A and 20B, and the reader/writers 20A and 20B are controlled by the reader/writer control device 10. The reader/writer control device 10 can independently drive (radiation and reception of radio waves) the antenna units $30A_1$~$30A_4$, $30B_1$~$30B_4$ through the reader/writers 20A and 20B.

In FIG. 6, the antenna units $30A_1$~$30A_4$, $30B_1$~$30B_4$ have the radiation characteristic of radiating radio waves toward the center of the spaces 400A and 400B, and the beam direction is indicated by the arrow mark $406A_1$~$406A_4$, $406B_1$~$406B_4$.

FIG. 7 shows an example of an occurrence of a dead spot by a direct wave in the arrangement of the antenna units $30A_1$~$30A_4$, $30B_1$~$30B_4$ shown in FIG. 6. Assume that the antenna units $30A_1$~$30A_4$, $30B_1$~$30B_4$ having the same beam directions are simultaneously driven. At this time, there is the possibility that, depending on the intensity of the radiation of radio waves of an antenna unit, the radio IC tag 40 cannot be read because the radio waves radiated by antenna units $30A_1$, $30A_3$, $30B_1$, $30B_3$ are stronger than the weak radio waves returned by the radio IC tag 40, they interfere with the weak radio waves returned by the radio IC tag 40. An area 700 indicates an area where the radio waves radiated by the antenna unit $30A_1$ interfere with the weak radio waves returned by the radio IC tag 40, and the radio IC tag 40 cannot be read. That is, in this area, there is the possibility that data cannot be read due to the interference of the radio waves from the radio IC tag 40.

The feature of the data reader 1 according to the embodiment resides in that the antenna units $30A_1$~$30A_4$, $30B_1$~$30B_4$ can be driven and controlled such that the antenna units having the same beam directions do not simultaneously driven to avoid the above-mentioned read impossible status or the read disabled status (also referred to as a read error) of the radio IC tag 40. That is, the antenna unit 30 is driven and controlled such that strong radio waves that are radiated by the antenna unit 30 reach in an area where another antenna unit 30 performs a read cannot interfere with the weak radio waves radiated by the radio IC tag 40 in the area.

FIGS. 8A, 8B, 9A, and 9B show examples of an operation of the data reader 1 which reads a radio IC tag while avoiding the read impossible status or the read disabled status of the radio IC tag 40 in the spaces 400A and 400B.

The data reader 1 drives only the antenna unit $30A_1$ in the space 400A as shown in FIG. 8A, and simultaneously drives only the antenna unit $30B_2$ in the space 400B. At this time, since the beam directions of the antenna units $30A_1$ and $30B_2$ are different, the radio waves radiated by one antenna unit 30 in the space 400A or 400B do not reach with strong electric field intensity an area where another antenna unit 30 is performing a read. As a result, the interference with the weak radio waves radiated by the radio IC tag 40 in the area can be avoided.

Next, the data reader 1 drives only the antenna unit $30A_2$ in the space 400A as shown in FIG. 8B, and simultaneously drives only the antenna unit $30B_3$ in the space 400B. At this time, since the beam directions $406A_2$ and $406B_3$ of the antenna units $30A_2$ and $30B_3$ are different, the radio waves radiated from one antenna unit 30 do not reach with strong electric field intensity the area where another antenna unit 30 is performing a read in the space 400A or 400B. As a result, the interference with the weak radio waves radiated by the radio IC tag 40 in the area can be avoided.

Next, the data reader 1 drives only the antenna unit $30A_3$ in the space 400A as shown in FIG. 9A, and simultaneously drives only the antenna unit $30B_4$ in the space 400B as shown in FIG. 9A. At this time, since the beam directions $406A_3$ and $406B_4$ of the antenna units $30A_3$ and $30B_4$ are different, the radio waves radiated from one antenna unit 30 do not reach with strong electric field intensity an area where another antenna unit 30 is performing a read in the space 400A or 400B. As a result, the interference with the week radio waves radiated by the radio IC tag 40 in the area can be avoided.

Finally, the data reader 1 drives only the antenna unit $30A_4$ in the space 400A as shown in FIG. 9A, and simultaneously drives only the antenna unit $30B_1$ in the space 400B as shown in FIG. 9B. At this time, since the beam directions $406A_4$ and $406B_1$ of the antenna units $30A_4$ and $30B_1$ are different, the radio waves radiated from one antenna unit 30 do not reach with strong electric field intensity an area where another antenna unit 30 is performing a read in the space 400A or 400B. As a result, the interference with the week radio waves radiated by the radio IC tag 40 in the area can be avoided.

By driving and controlling the antenna unit 30 as described above, all antenna units 30 provided for the spaces 400A and 400B are driven, the radio waves radiated by one antenna unit 30 do not reach with strong electric field intensity the area where another antenna unit 30 is performing a read, thereby avoiding the weak radio waves radiated by the radio IC tag 40 in the area.

The antenna unit 30 can be designed to set the beam direction as a diagonal direction in a rectangular space. In this case, the antenna unit 30 can be driven and controlled such that the antenna units having the same beam directions are not simultaneously driven in the space adjacent in the diagonal direction.

Figure 10:
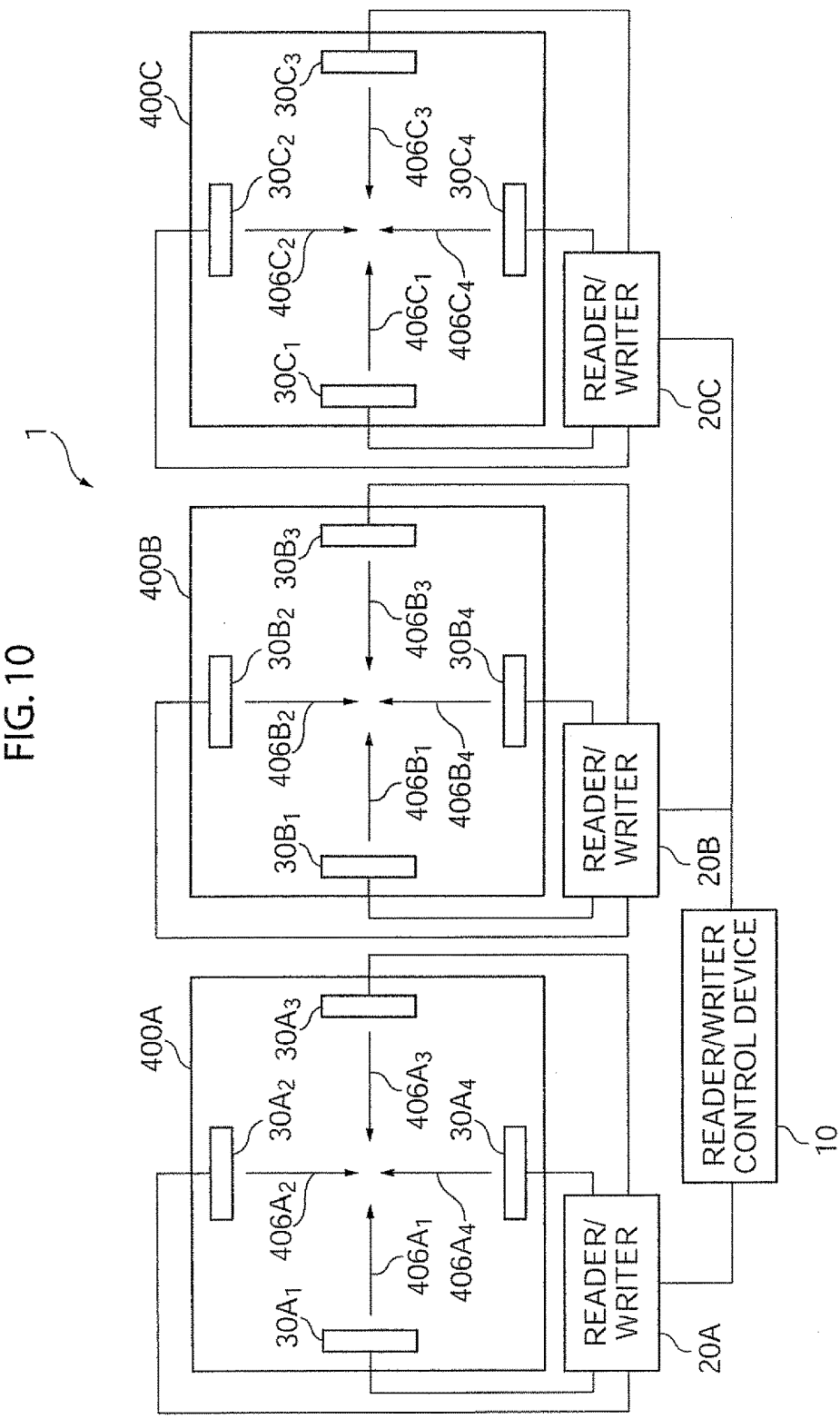
FIG. 10 shows an example of the data reader 1 arranged in the three consecutive spaces.

The above-mentioned antenna units can be driven and controlled when there are three or more adjacent spaces. FIG. 10 shows an example of the data reader 1 for reading the radio IC tag 40 in the consecutive three spaces 400A, 400B, and 400C (corresponding to small sections, rooms, etc.). The data reader 1 has four antenna units $30A_1$~$30A_4$, $30B_1$~$30B_4$, $30C_1$~$30C_4$ for each of the three spaces 400A, 400B, and 400C. The antenna units $30A_1$~$30A_4$, $30B_1$~$30B_4$, $30C_1$~$30C_4$ are connected to the reader/writers 20A, 20B, and 20C, and the reader/writers 20A, 20B, and 20C are controlled by the reader/writer control device 10. The reader/writer control device 10 can independently drive (to radiate and receive radio waves) the antenna units $30A_1$~$30A_4$, $30B_1$~$30B_4$, $30C_1$~$30C_4$ through the reader/writers 20A, 20B, and 20C.

In FIG. 10, the antenna units $30A_1$~$30A_4$, $30B_1$~$30B_4$, $30C_1$~$30C_4$ have the radiation characteristic of radiating radio waves towards the center of the spaces 400A, 400B, and 400C, and the beam direction is indicated by the arrow marks $406A_1$~$406A_4$, $406B_1$~$406B_4$, $406C_1$~$406C_4$.

Figure 11:
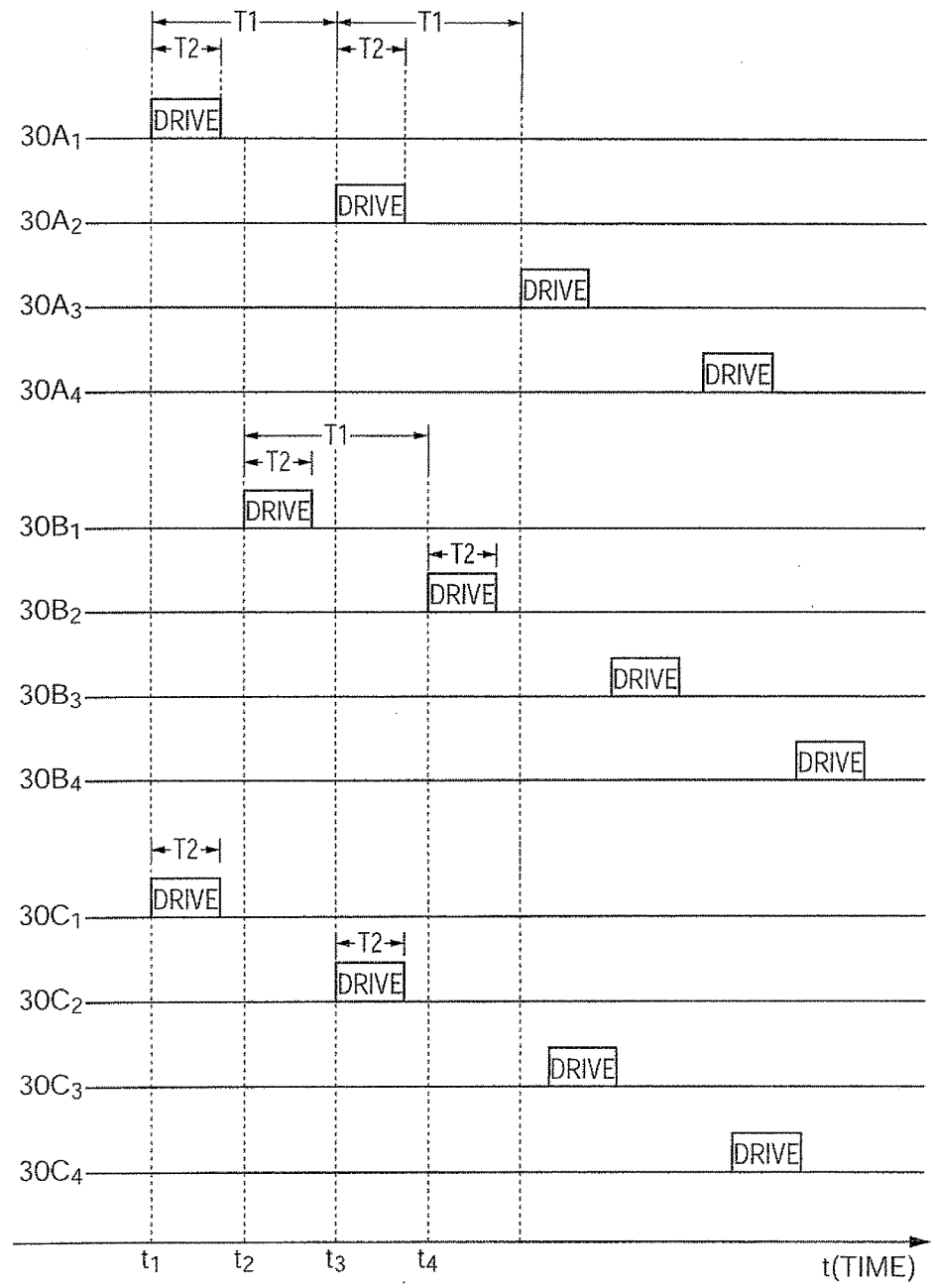
FIG. 11 is a timing chart showing an operation of the data reader shown in FIG. 10.

FIG. 11 is a timing chart showing an operation of the data reader 1 shown in FIG. 10, and shows the drive timing of the antenna units $30A_1$~$30A_4$, $30B_1$~$30B_4$, $30C_1$~$30C_4$ by the reader/writer control device 10.

As shown in FIG. 11, the antenna units $30A_1$~$30A_4$, $30B_1$~$30B_4$, $30C_1$~$30C_4$ as a four-unit set drives any antenna unit in the same set in the period T1, and the drive time is T2 (T2≤T1/N, N indicates the number of sets of the antenna units). In the example shown in FIG. 11, the reader/writer control device 10 or the reader/writer 20A first drives the antenna unit $30A_1$ for the time T2 in the space 400A, and simultaneously drives the antenna unit $30C_1$ for the time T2 in the space 400C (time $t_1$). At this time, in the space 400B where there is the possibility of the interference by the strong radio waves radiated by the antenna units $30A_1$ and $30C_1$ with the weak radio waves radiated by the radio IC tag 40, no antenna unit 30 is driven. Therefore, in any of the spaces 400A, 400B, and 400C, there is no read impossible status or read disabled status of the radio IC tag 40 caused by the interference of the radio waves radiated by the antenna unit 30 with the weak radio waves radiated by the radio IC tag 40.

Next, the reader/writer control device 10 drives the antenna unit $30B_1$ in the space 400B for time T2 after the drive time T2 of the antenna units $30A_1$ and $30C_1$ (at time $t_2$). At this time, in the spaces 400A and 400C where it is expected that there is the interference of the radio waves radiated from the antenna unit $30B_1$, no antenna unit 30 is driven. Therefore, in any of the spaces 400A, 400B, and 400C, there occurs no read error of the radio IC tag 40 by the interference of the radio waves radiated by the antenna unit 30 with the weak radio waves radiated by the radio IC tag 40.

Next, the reader/writer control device 10 drives the antenna unit $30A_2$ in the space 400A and the antenna unit $30C_2$ in the space 400C simultaneously for time T2 at time $t_3$ after the passage of time T1 from the previous time $t_1$ after the termination of the drive time T2 of the antenna unit $30B_1$. At this time, in the space 400B where there is the probability of the interference of the radio waves radiated from the antenna units $30A_2$ and $30C_2$, no antenna unit is driven. Therefore, in any of the spaces 400A, 400B, and 400C, there is no read error of the radio IC tag 40 caused by the interference of the radio waves radiated by the antenna unit 30 with the weak radio waves radiated by the radio IC tag 40. Since the direct waves from the antenna units $30A_2$ and $30C_2$ do not reach the space 400B depending on the radiation characteristic (for example, a beam direction different from the space 400B) of the antenna units $30A_2$ and $30C_2$, any antenna unit in the space 400B can be driven.

Next, the reader/writer control device 10 drives the antenna unit 30B$_2$ in the space 400B for time T2 at time t$_4$ after the passage of time T1 from the previous time t$_2$ after the termination of the drive time T2 of the antenna units 30A$_2$ and 30C$_2$. At this time, in the spaces 400A and 400C where there is the probability of the interference of the radio waves radiated from the antenna unit 30B$_2$, no antenna unit is driven. Therefore, in any of the spaces 400A, 400B, and 400C, there is no read error of the radio IC tag 40 caused by the interference of the radio waves radiated by the antenna unit 30 with the weak radio waves radiated by the radio IC tag 40. Since the direct waves from the antenna units 30B$_2$ do not reach the spaces 400A and 400C depending on the radiation characteristic (for example, a beam direction different from the spaces 400A and 400C) of the antenna units 30B$_2$, any antenna unit in the spaces 400A and 400C can be driven.

In the similar method, by sequentially driving and controlling the antenna unit 30, a read error of the radio IC tag 40 by the interference of the radio waves radiated by the antenna unit 30 with the weak radio waves radiated by the radio IC tag 40 can be avoided.

In the above-mentioned data reader 1, the occurrence of the interference with the radio waves between the reader/writer 20 and the radio IC tag 40 can be avoided by the driving timing of the antenna unit 30. However, when a plurality of frequencies or channels are available in the communication between the reader/writer 20 and the radio IC tag 40, the present invention can be established as the configuration of avoiding the read error of the radio IC tag 40 due to the interference with the weak radio waves radiated by the radio IC tag 40 by the radio waves radiated by another antenna unit 30 by combining the selection or change of the drive timing and frequency.

B. Second Embodiment

The second embodiment is explained below.

The second embodiment prevent failing in reading the radio IC tag 40 existing in the read target range by changing the position of the dead spot (null point) generated by the combination with a interference wave by the reader/writer 20 changing the phase of the radio waves for a read radiated from the antenna unit 30.

The configuration of the data reader according to the second embodiment is basically the same as the configuration of the data reader 1 according to the first embodiment, but it is different in that the modulation unit 23 of the reader/writer 20 has the function of adjusting the phase by shifting the phase of a carrier (carrier wave).

Figure 12:
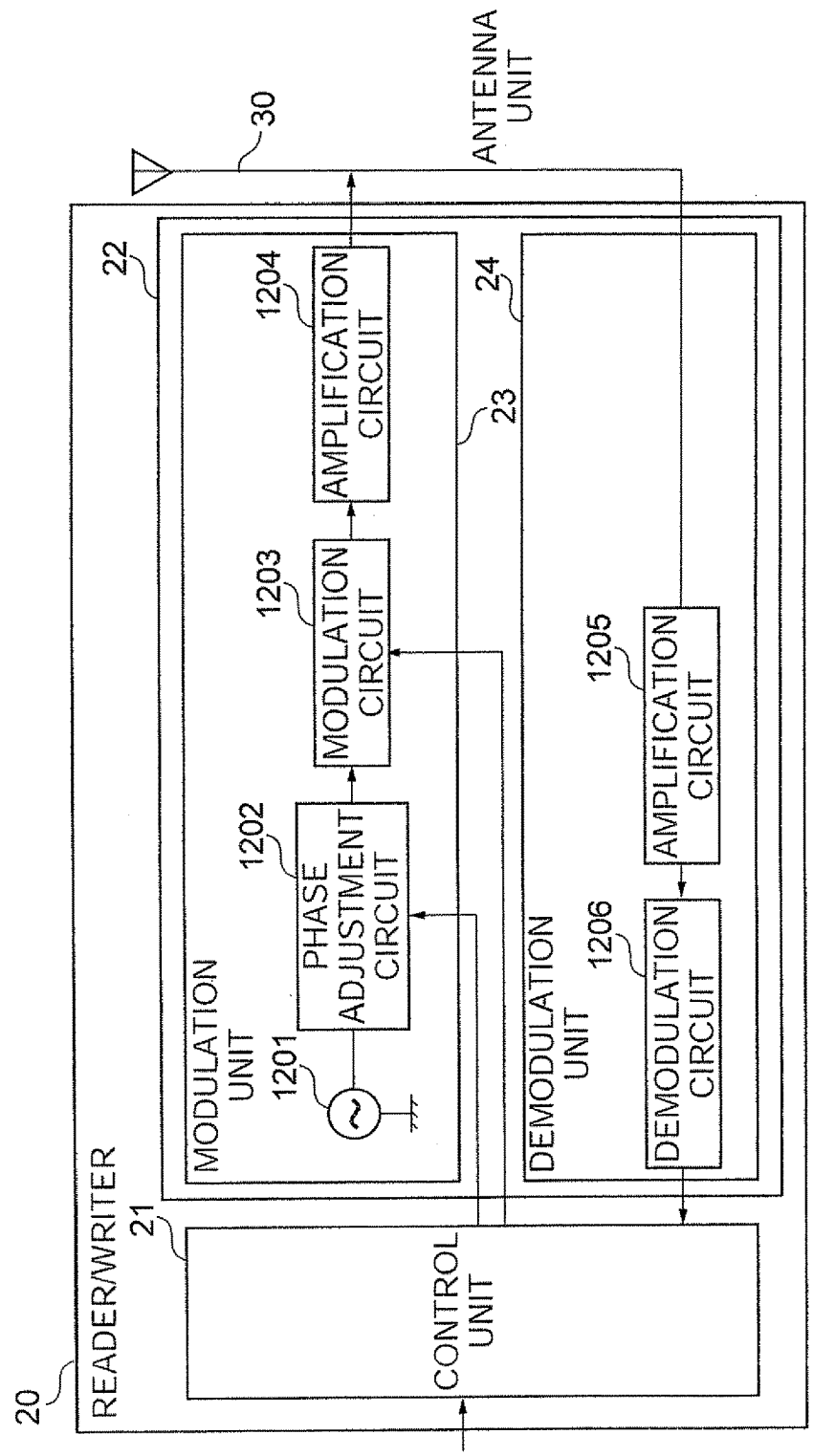
FIG. 12 is a block diagram showing the function of an example of the configuration of the reader/writer according to the second embodiment.

FIG. 12 is a block diagram showing the function of an example of the configuration of the reader/writer 20 according to the second embodiment.

The modulation unit 23 includes an oscillation circuit 1201 for generating a carrier signal, a phase adjustment circuit 1202 capable of changing the phase of the carrier signal generated by the oscillation circuit 1201, a modulation circuit 1203 for generating a modulated signal according to an information signal supplied by the control unit 21 with a carrier signal output from a phase adjustment circuit 1202, and a amplification circuit 1204 for amplifying the modulated signal output from the modulation circuit 1203.

The demodulation unit 24 includes an amplification circuit 1205 for amplifying a signal received from the radio IC tag 40 through the antenna unit 30 up to the level at which the signal can be demodulated, and a demodulation circuit 1206 for demodulating the signal amplified by the amplification circuit 1205 in a predetermined demodulating system, and retrieving information or data.

The oscillation circuit 1201 included in the modulation unit 23 generates a carrier wave of a frequency depending on the radio frequency band for a read used by the data reader 1. The phase adjustment circuit 1202 is a circuit for changing the phase of a carrier wave depending on the control signal from the control unit 21 and outputting the result, and can be, for example, a PLL (Phase Locked Loop) circuit having the function of programmable phase shift, a phase shifter, etc. The phase adjustment circuit 1202 adjusts the phase of a carrier wave based on plural different amounts of phase changes. For example, the phase adjustment circuit 1202 adjusts the phase by outputting for a predetermined period $\pi/2$ phase advanced carrier wave depending on the control signal from the control unit 21, then outputting for a predetermined period a $\pi$ phase advanced carrier wave, and further outputting for a predetermined period a $3\pi/2$ phase advanced carrier wave. In this example, a phase change is performed in a $\pi/2$ unit, but the phase adjustment can be made in any unit such as $\pi/4$, $\pi/8$, etc.

FIGS. 13A to 13D are explanatory views showing a dead spot (null point) occurring when the data reader 1 according to the embodiment radiates radio waves for a read while changing the phase. In FIGS. 13A to 13D, the solid lines indicate a radio waves 1301 for a read, the dotted lines indicate an interference wave 1302, and the broken lines indicate a composite wave 1303 of the radio waves 1301 for a read and the interference wave 1302. The vertical axis indicates the intensity (amplitude), the horizontal axis indicates the distance from the reference point O (for example, the position of an antenna unit).

Figure 13A:
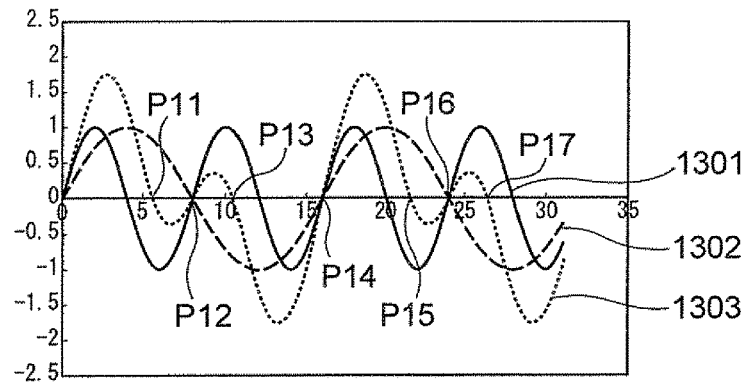
FIG. 13A shows the waveforms of a radio wave for a reads an interference wave, and a composite wave.

FIG. 13A shows the status in which the radio waves 1301 for a read are radiated without adjusting by the phase adjustment circuit 1202 the phase of the carrier wave generated by the oscillation circuit 1201. In this status, the point where the amplitude of the composite wave 1303 of the radio waves 1301 for a read and the interference wave 1302 becomes 0 is a dead spot. In the example shown in FIG. 13A, a dead spot occurs at the positions P11 to P17.

Figure 13B:
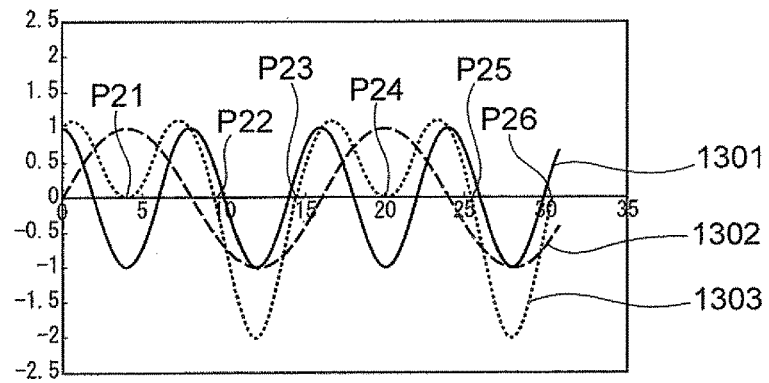
FIG. 13B shows the waveforms of a radio waves for a read, an interference wave, and a composite wave with π/2 advanced phase from those shown in FIG. 13A.

FIG. 13B shows the status of the radiated radio waves 1301 for a read after the phase adjustment made by the phase adjustment circuit 1202 by $\pi/2$ advancing the carrier wave generated by the oscillation circuit 1201. In FIG. 13B, the radio waves 1301 for a read are radiated by $\pi/2$ advancing the waves as compared with those shown in FIG. 13A. The interference wave 1302 is not changed as in the case shown in FIG. 13A. In this status, the point where the amplitude of the composite wave 1303 of the radio waves 1301 for a read and the interference wave 1302 becomes 0 is a dead spot. In the example shown in FIG. 13B, a dead spot occurs at the positions P21 to P26.

Figure 13C:
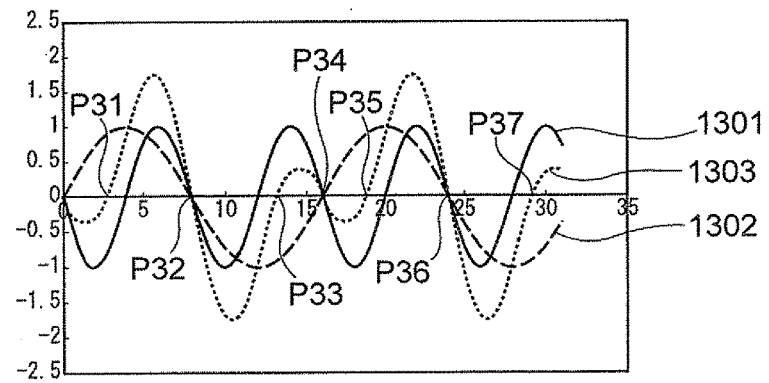
FIG. 13C shows the waveforms of a radio waves for a read, an interference wave, and a composite wave with π/2 advanced phase from those shown in FIG. 13B.

FIG. 13C shows the radio waves 1301 for a read radiated after the phase adjustment circuit 1202 further advances by $\pi/2$ the phase of the carrier wave generated by the oscillation circuit 1201. In FIG. 13C, the radio waves 1301 for a read are radiated with $\pi/2$ further advanced as compared with those shown in FIG. 13B, and with $\pi$ further advanced as compared with those shown in FIG. 13A. The interference wave 1302 is not changed as in the case shown in FIGS. 13A and 13B. In this status, the point where the amplitude of the composite wave 1303 of the radio waves 1301 for a read and the interference wave 1302 becomes 0 is a dead spot. In the example shown in FIG. 13C, a dead spot occurs at the positions P31 to P37.

Figure 13D:
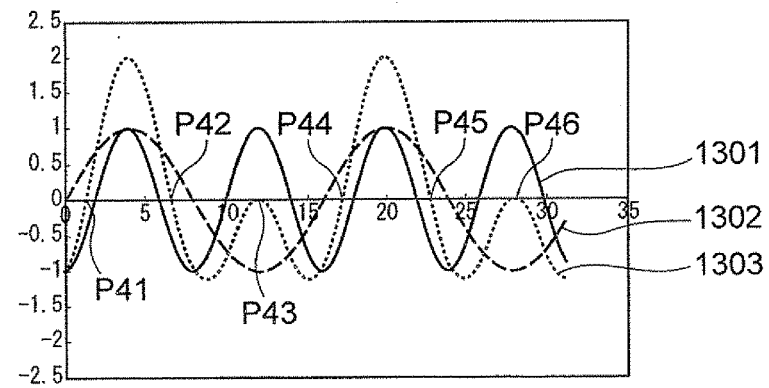
FIG. 13D shows the waveforms of a radio waves for a read, an interference wave, and a composite wave with π/2 advanced phase from those shown in FIG. 13C.

FIG. 13D shows the radio waves 1301 for a read radiated after the phase adjustment circuit 1202 further advances by π/2 the phase of the carrier wave generated by the oscillation circuit 1201. In FIG. 13D, the radio waves 1301 for a read are radiated with π/2 further advanced as compared with those shown in FIG. 13C, and with 3π/2 further advanced as compared with those shown in FIG. 13A. The interference wave 1302 is not changed as in the case shown in FIGS. 13A, 13B, and 13C. In this status, the point where the amplitude of the composite wave 130 of the radio waves 1301 for a read and the interference wave 1302 becomes 0 is a dead spot. In the example shown in FIG. 13D, a dead spot occurs at the positions P41 to P46.

Figure 14A:
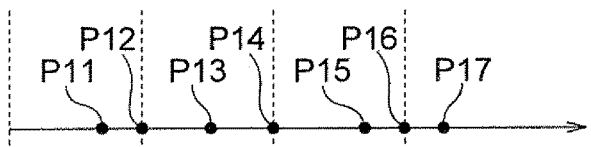
FIG. 14A shows the position of the dead spot occurring in the example shown in FIG. 13A.
Figure 14B:
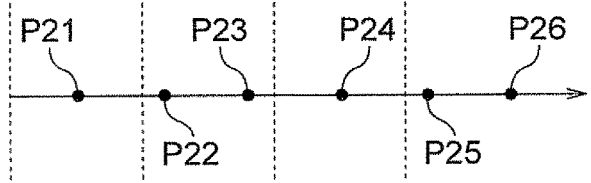
FIG. 14B shows the position of the dead spot occurring in the example shown in FIG. 13B.
Figure 14C:
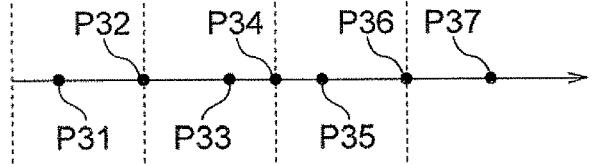
FIG. 14C shows the position of the dead spot occurring in the example shown in FIG. 13C.
Figure 14D:
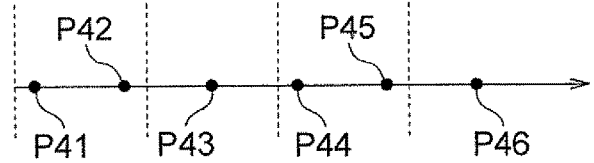
FIG. 14D shows the position of the dead spot occurring in the example shown in FIG. 13D.

FIGS. 14A to 14D show the comparison of the positions of the dead spots occurring in the respective cases shown in FIGS. 13A to 13D. FIG. 14A shows the positions P11 to P17 of the dead spots occurring in the example shown in FIG. 13A. FIG. 14B shows the positions P21 to P26 of the dead spots occurring in the example shown in FIG. 13B. FIG. 14C shows the positions P31 to P37 of the dead spots occurring in the example shown in FIG. 13C. FIG. 14D shows the positions P41 to P46 of the dead spots occurring in the example shown in FIG. 13D.

As shown in FIGS. 14A to 14D, the positions of the dead spots are changed in many cases by changing the phase of the radio waves 1301 for a read. For example, the dead spot occurring in the position P11 shown in FIG. 14A can be removed in the case shown in FIG. 14B (when the phase is π/2 advanced). When there is a radio IC tag at the position P11, the radio IC tag at the position P11 cannot be read when a radio waves for a read is radiated in the phase shown in FIG. 13A, but the position P11 is not a dead spot when the radio waves for a read is radiated in the phase shown in FIG. 13B with the phase of the carrier wave π/2 advanced (refer to FIG. 14B), and the radio IC tag at the position P11 can be read. This holds true with the other positions P12 to P17, P21 to P26, P31 to P37, and P41 to P46. That is, by radiating the radio waves for a read with the phase of a carrier wave changed, the data reader changes the position of an occurrence of a dead spot, thereby successfully reading a radio IC tag at all positions in a read range.

C. Third Embodiment

The first and second embodiments can be applied to a positioning system for designating the position of the radio IC tag 40. The third aspect of the present invention is proposed as a system realized for designating a position with higher accuracy by reading the radio IC tag 40 depending on the dead spot in the positioning system for designating the position of the radio IC tag 40.

FIG. 15 shows an example of the configuration of the positioning system which is the third aspect of the present invention.

A positioning system 1500 includes the antenna unit 30 and a reader/writer 20X for reading the radio IC tag 40, the reader/writer control device 10 for controlling the reading operation of the reader/writer 20X, and a positioning device 50 for designating the position of the radio IC tag 40 based on the intensity of a radio signal from the radio IC tag 40 read by the reader/writer 20X. The same devices and components as in the first and second embodiments are assigned the same reference numerals as those in the first and second embodiments, and the detailed explanation is omitted here.

[C.1. Reader/Writer]
FIG. 16 is a block diagram showing the function of an example of the configuration of the reader/writer 20X.

The reader/writer 20X includes the control unit 21 having a CPU, etc., a transmission/reception unit 22 connected to the control unit 21 as a circuit for transmitting and receiving by wireless for modulation, demodulation, amplification, etc., and the antenna switch unit 25 for selectively providing a modulated carrier wave supplied by the transmission/reception unit 22 with the antenna units $30_1$, $30_2$, $30_3$, and $30_4$. The antenna switch unit 25 is connected to the antenna units $30_1$, $30_2$, $30_3$, and $30_4$.

The control unit 21 receives an instruction from the reader/writer control device 10, drives the transmission/reception unit 22 according to the instruction, and transmits the data output from the transmission/reception unit 22 (a specific ID, etc. read from the radio IC tag 40) to the reader/writer control device 30. The control unit 21 transmits a switch instruction to the antenna switch unit 25 to selectively drive the antenna units $30_1$, $30_2$, $30_3$, and $30_4$. The control unit 21 changes the radiation characteristic of each of the antenna units $30_1$, $30_2$, $30_3$, and $30_4$ (for example, the electric field pattern, the beam direction, the beam width, the polarization direction (vertical polarization, horizontal polarization, counterclockwise circular polarization, and clockwise circular polarization), etc.). The antenna (not shown in the attached drawings) provided for the antenna unit 30 can be an antenna capable of changing the radiation characteristic under the control described about the first embodiment, for example, a phased array antenna, etc.

The transmission/reception unit 22 communicates with the radio IC tag 40 by wireless through the antenna units $30_1$, $30_2$, $30_3$, and $30_4$. The transmission/reception unit 22 has the modulation unit 23 and the demodulation unit 24. The modulation unit 23 modulates a signal according to the information such as a predetermined command, request, instruction, etc. received from the control unit 21 in a predetermined modulation system, and generates a transmission signal (modulated carrier wave). The demodulation unit 24 demodulates the carrier wave modulated in the predetermined modulation system according to the signal depending on the data stored in the radio IC tag 40, retrieves a signal depending on the data stored in the radio IC tag 40, and transmits it to the control unit 21.

As a variation of the configuration of each of the antenna units $30_1$, $30_2$, $30_3$, and $30_4$ (when each unit is not specified, they are simply referred to as the "antenna unit 30"), each antenna unit 30 includes a plurality of antennas for radiating radio waves having different polarization directions. They can be selectively driven based on the control instruction from the reader/writer 20X or the reader/writer control device 10. For example, each antenna unit 30 has four antennas including a dipole antenna for radiating the polarization in the vertical direction, a dipole antenna for radiating the polarization in the horizontal direction, a circular polarization patch antenna for radiating clockwise circular polarization, and a circular polarization patch antenna for radiating counterclockwise circular polarization. They can be selectively driven for transmission of radio waves having desired polarization directions.

These four antennas are provided with modulated carrier waves selectively by the antenna switch unit 25. The selected antenna radiates the modulated carrier wave received from the transmission/reception unit 22, more specifically the modulation unit 23, into the air, radiates radio waves having the selected polarization direction toward the radio IC tag 40, receives a transmission signal (for example, a signal depending on the change of the electric field generated by load modulation) from the radio IC tag 40, and provides the signal for the transmission/reception unit 22, more specifically the demodulation unit 24. The demodulation unit 24 has the function of measuring the reception intensity of the signal transmitted from the radio IC tag 40 and the electromagnetic field changed by load modulation, etc., and transmits the reception intensity to the control unit 21 together with the signal obtained as a result of demodulation.

It is not necessary to separate the antenna unit 30 from the reader/writer 20X, but the antenna unit 30 can be stored in the housing of the reader/writer 20X. The antenna unit 30 is formed by a transmitting antenna/receiving antenna and a case for protecting them. The antenna unit 30 is a device or a unit separate from the body of the reader/writer (not shown in the attached drawings) storing the control unit 21 and the transmission/reception unit 22, and connected to the body of the reader/writer via a cable, etc. Therefore, the antenna unit 30 is designed to be mounted in a place separate from the body of the reader/writer. It is also possible to connect a plurality of antenna units 30 which are mounted in different places to one body of reader/writer, and the body of the reader/writer switches and uses a plurality of antenna units 30.

As another example of the configuration, the embodiment can be realized by incorporating one of a plurality of antenna units 30 connected to the reader/writer 20X into the reader/writer 20X.

The reader/writer 20X, more specifically the control unit 21, reads the radio IC tag 40 by switching the antenna units $30_1$, $30_2$, $30_3$, and $30_4$. The reader/writer 20X, more specifically the control unit 21, records the reception intensity of the radio waves transmitted as an answer from the radio IC tag 40 when a read is performed for each of the antenna units $30_1$, $30_2$, $30_3$, and $30_4$.

[C.2. Radio IC Tag]

Since the configuration of the radio IC tag 40 is the same as the configurations of the first and second embodiments, the explanation is omitted here.

[C.3. Reader/Writer Control Device]

Since the configuration of the reader/writer control device 10 is the same as the configurations of the first and second embodiments, the explanation is omitted here.

[C.4. Positioning Device]

The positioning device 50 has the function of designating the position of the radio IC tag 40 based on the reception intensity of the radio waves from the radio IC tag 40 received in each of the antenna units 30.

The positioning device 50 is provided with an arithmetic operation unit (CPU), a main memory (RAM), a read-only memory (ROM), an input/output device (I/O), and an external storage device such as a hard disk device, etc. as necessary, and can be, for example, an information processing device such as a computer, a work station, etc. The ROM, a hard disk device, etc. stores a program to allow the information processing device to function as the positioning device 50, or a program used to direct a computer to use the positioning method. By loading the programs into the RAM and allowing the CPU to execute it, the positioning device 50 is realized or the positioning method is executed. In the example of the configuration shown in FIG. 15, the reader/writer control device 10 is separate from the positioning device 50. However, the present invention is not limited to this application, but the same information processing device (personal computer, work station, etc.) can function as the reader/writer control device 10 and the positioning device 50.

Figure 17:
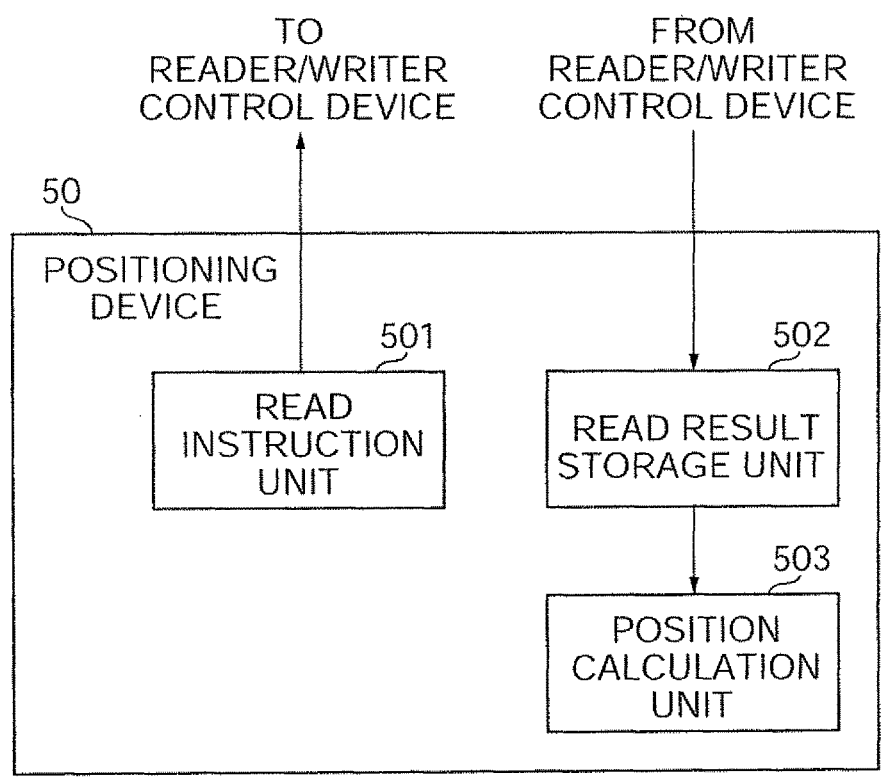
FIG. 17 is a block diagram showing the function of an example of the positioning device according to the third embodiment.

FIG. 17 is a block diagram of the function showing an example of the positioning device 50.

The positioning device 50 includes a read instruction unit 501, a read result storage unit 502, and a position calculation unit 503.

The read instruction unit 501 has the function of issuing an instruction to perform a reading process to the reader/writer 20X through the reader/writer control device 10 when a position is designated. Upon receipt of the instruction, the reader/writer 20X changes the radiation characteristic of an antenna (for example, an electric field pattern, a beam direction, a beam width, etc.) for each antenna unit 30, and performs the reading process while switching radio waves having different polarization directions. For example, the reader/writer 20X changes the radiation characteristic of an antenna for each of the antenna units 30 such that the beam direction is the first direction, performs the reading process by switching and transmitting the radio waves having different polarization directions, then changes the radiation characteristic of the antennas such that the beam direction can be the second direction different from the first direction for each antenna unit 30, and performs the reading process by switching and transmitting the radio waves having different polarization directions. At this time, the positioning system 1500, more specifically the reader/writer 20X, measures the reception intensity of the signal from the radio IC tag 40 in the reading process, and stores it.

The process of performing the reading process by switching and transmitting the radio waves having different polarization direction is described below. That is, in the above-mentioned antenna configuration example, all radio IC tags 40 in the communication area are read using the vertical polarization while changing the radiation characteristic of each antenna unit 30. Then, all radio IC tags 40 in the communication area are read using the horizontal polarization while changing the radiation characteristic of an antenna. Next, while changing the radiation characteristic of the antenna, all radio IC tags 40 in the communication area are read using the clockwise circular polarization. Finally, all radio IC tag 40 in the communication area is read using the clockwise circular polarization while changing the radiation characteristic of the antenna. As necessary, it is effective to switch the polarization as described above while switching the channel used as a read frequency of the reader/writer 20.

In the reading process using each type of polarization while changing the radiation characteristic of an antenna, the reader/writer 20X communicates with all radio IC tags 40 in the communication area of each antenna unit 30 for each radiation characteristic of an antenna, and notifies the positioning device 50, more specifically the read result storage unit 502, through the reader/writer control device 10 of all specific IDs on which the reading process can be successfully performed as a result of the communication.

The read result storage unit 502 has the function of storing a read result received from the reader/writer 20X. FIG. 18 shows an example of the read result data stored in the read result storage unit 502. The read result data shown in FIG. 18 is an example of storing a result of a read from the antenna unit 30 as a table 1800. The table 1800 is stored in the read result storage unit 502 one by one for each antenna unit 30 or each antenna provided for the antenna unit 30.

The table 1800 has a record 1801 for each specific ID read by the reader/writer 20X. Each record 1801 has a specific ID field 1802 storing a specific ID, a vertical polarization field 1803 storing the radio wave intensity received from the radio IC tag 40 having a corresponding specific ID in the reading process using vertical polarization, a horizontal polarization field 1804 storing the radio wave intensity received from the radio IC tag 40 having a corresponding specific ID in the reading process using horizontal polarization, a clockwise circular polarization field 1805 storing the radio wave intensity received from the radio IC tag 40 having a corresponding specific ID in the reading process using clockwise circular polarization, a counterclockwise circular polarization field 1806 storing the radio wave intensity received from the radio IC tag 40 having a corresponding specific ID in the reading process using counterclockwise circular polarization, an evaluated radio wave intensity field 1807 storing the radio wave intensity determined after totally judging the radio wave intensity when each type of polarization is used, and an estimated distance field 1808 storing the estimated distance determined based on the evaluated radio wave intensity. Although there are various methods of totally judging the radio wave intensity when each type of polarization is used, the highest radio wave intensity is defined as evaluated radio wave intensity in the present embodiment.

The specific ID field 1802 stores a specific ID given by the reader/writer 20X. Since one record stores one specific ID, when, for example, 50 specific IDs are read in one reading operation, 50 records 1801 are generated in the table 1800.

Each of the polarization fields 1803 to 1806 stores the information or data corresponding to the intensity of the received radio waves. The positioning system 1500 changes the radiation characteristic of an antenna, and measures the radio wave intensity of the response from the radio IC tag 40 received when each type of polarization is transmitted for each radiation characteristic. The positioning system 1500, more specifically the positioning device 50, determines the radio wave intensity when the polarization is used using the radio wave intensity measured in each radiation characteristic, and stores it in the corresponding field. For example, when the positioning system 1500 radiates the vertical polarization while controlling the radiation characteristic of the antenna such that the beam direction can be the first direction for the antenna unit 30, the radio wave intensity received from the radio IC tag 40 is X1, and when it radiates the vertical polarization while controlling the radiation characteristic of the antenna such that the beam direction can be the second direction, the radio wave intensity of the response received from the radio IC tag 40 is X2. Then, the positioning system 1500, more specifically the positioning device 50, stores the value determined based on the predetermined radio wave intensity X1 and X2 in the record 1801 of the table 1800 corresponding to the antenna unit 30, that is, the vertical polarization field 1803 of the record 1801 corresponding to the radio IC tag 40. The method of determining a value to be stored is optional, but, for example, the positioning system 1500, more specifically the positioning device 50, stores the radio wave intensity X1 or X2 whichever is larger in the vertical polarization field 1803.

The estimated distance field 1808 stores the distance estimated based on the evaluated radio wave intensity stored in the evaluated radio wave intensity field 1807, that is, the estimated distance between the radio IC tag having the specific ID corresponding to the record and the antenna unit 30 corresponding to the table 1800. The estimated distance is the information calculated by the position calculation unit 503 as described later. In this example, it is a part of the table 1800, but it is not necessary that the information is a part of the table 1800.

As described above, the above-mentioned table 1800 is generated for each antenna unit 30 or each antenna provided for the antenna unit 30. Therefore, the estimated distance between one radio IC tag 40 and each antenna unit 30 or each antenna provided for the antenna unit 30 is finally stored in the read result storage unit 502.

The explanation of an example of the configuration of the positioning device 50 is continued below by referring to in FIG. 17.

The position calculation unit 503 calculates the estimated distance between the antenna unit 30 or each antenna provided for the antenna unit 30 and the radio IC tag 40 having each specific ID based on the evaluated radio wave intensity stored in the evaluated radio wave intensity field 1807, and the radio IC tag 40 having each specific ID is calculated based on each estimated distance.

Figure 19:
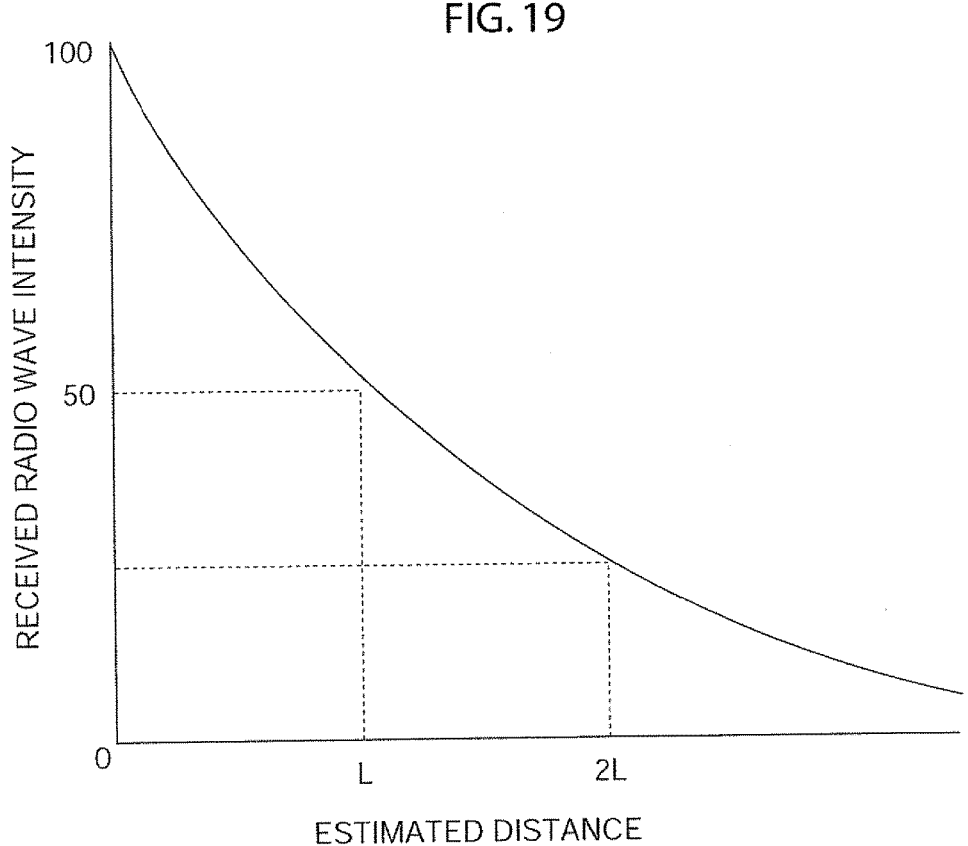
FIG. 19 shows an example of the data for use by the position calculation unit calculating the estimated distance from the evaluated radio wave intensity.

FIG. 19 shows an example of the data for use by the position calculation unit 503 in calculating the estimated distance from the evaluated radio wave intensity. The data shown in FIG. 19 is expressed as a graph for uniquely identifying an estimated distance depending on the value of the evaluated radio wave intensity (vertical axis). For example, the estimated distance of 0 can be assigned to the evaluated radio wave intensity 100 (in, for example, a dB or μV unit, etc.), the estimated distance of L can be assigned to the evaluated radio wave intensity 50, and the estimated distance of 2 L can be assigned to the evaluated radio wave intensity 25. The data can be generated by obtaining the statistics of the radio wave intensity while changing the distance between the radio IC tag 40 and the reader/writer 20, but the data can also be generated in other methods.

FIG. 20 shows an example of a table storing the result of the position calculation unit 503 calculating the estimated position of the radio IC tag 40 based on the estimated distance calculated from the evaluated radio wave intensity. In this example, a position is designated using two different antenna units 30 (hereinafter identified as an antenna unit A and an antenna unit B). A table 2000 has one record 2001 for each specific ID. Each record 2001 has a specific ID field 2002 storing a specific ID, a first estimated distance field 2003 storing the estimated distance to the antenna unit A, a second estimated distance field 2004 storing the estimated distance to the antenna unit B, and an estimated position field 2005 storing the estimated position of the radio IC tag 40 corresponding to the specific ID.

Figure 21:
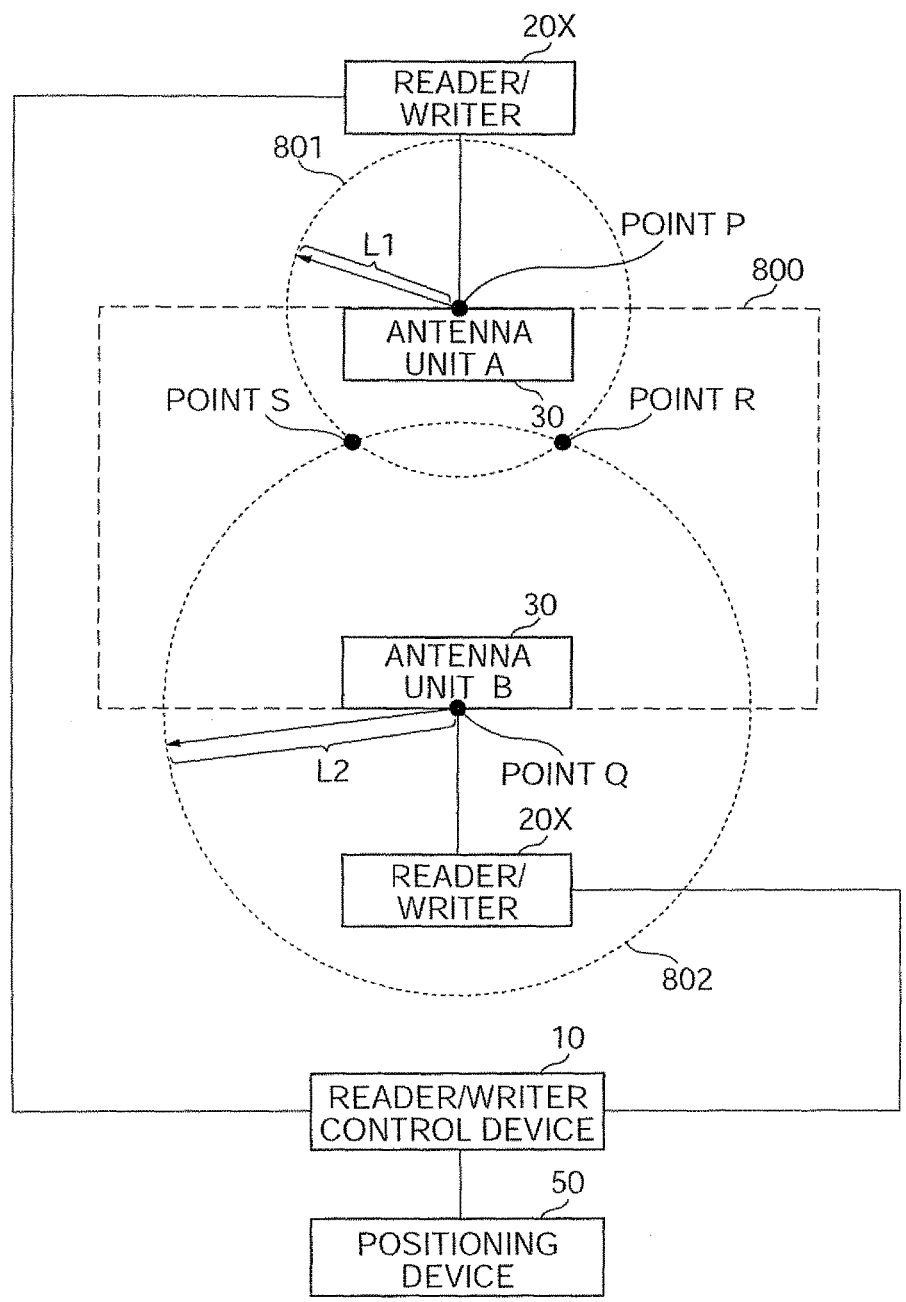
FIG. 21 shows the concept of the method of calculating the estimated position based on the estimated distance stored in the first estimated distance field and the second estimated distance field.

The estimated position stored in the estimated position field 2005 is calculated by the position calculation unit 503 based on the estimated distance stored in the first estimated distance field 2003 and the second estimated distance field 2004 FIG. 21 shows the concept of the method of calculating the estimated position based on the estimated distance stored in the first estimated distance field 2003 and the second estimated distance field 2004. In this example, two antenna units A and B are provided in a space (for example, a warehouse). The position of the antenna unit A is defined as the point P, and the position of the antenna unit B is defined as the point Q.

Assume that the estimated distance between the radio IC tag 40 and the reader/writer A is L1, and the estimated distance between the radio IC tag 40 and the antenna unit B is L2. Then, the radio IC tag is located on a circle 801 having a radius of L1 and a center point P, and on a circle 802 having a radius of L2 and a center point Q. That is, by obtaining the intersection of the circles 801 and 802, the estimated position of the radio IC tag 40 can be obtained.

The estimated position is not always coordinate information, but the information designating an area having a certain range (for example, each section obtained by dividing a space into 16 segments) can be an estimated position. Since there are two intersections (points R and S) in the example shown in FIG. 21, the coordinates cannot be uniquely determined. In this case, the area including these two intersections R and S can be an estimated position.

The explanation of the example of the table 2000 storing a result of calculating an estimated position is continued by referring to FIG. 20.

The estimated position calculated as described above is stored in the estimated position field 2005 of each record 2001. The positioning device 50 outputs the estimated position for each specific ID by referring to the table 2000, and can provide the estimated position of each radio IC tag 40 for a user. Furthermore, the estimated position obtained by the positioning system 1500 can be acquired with higher accuracy without failing in reading any data due to a dead spot.

D. Fourth Embodiment

The fourth embodiment of the present invention is proposed as a system for designating a position with higher accuracy by reading the radio IC tag 40 while processing a dead spot in the positioning system for designating the position of the radio IC tag 40.

The features of the positioning system are: reading the radio IC tag 40 in the communication area by switching the frequency (or period, wavelength, etc.) of the radio waves for a read radiated by a reader/writer, measuring the intensity of a signal received from the radio IC tag 40 when data is read; and designating the position of the radio IC tag 40 based on the reception intensity of the measured signal.

Since the configuration of the positioning system according to the fourth embodiment is the same as the configuration of the third embodiment, the explanation of the configuration of the positioning system is omitted here.

[D.1. Reader/Writer]

Figure 22:
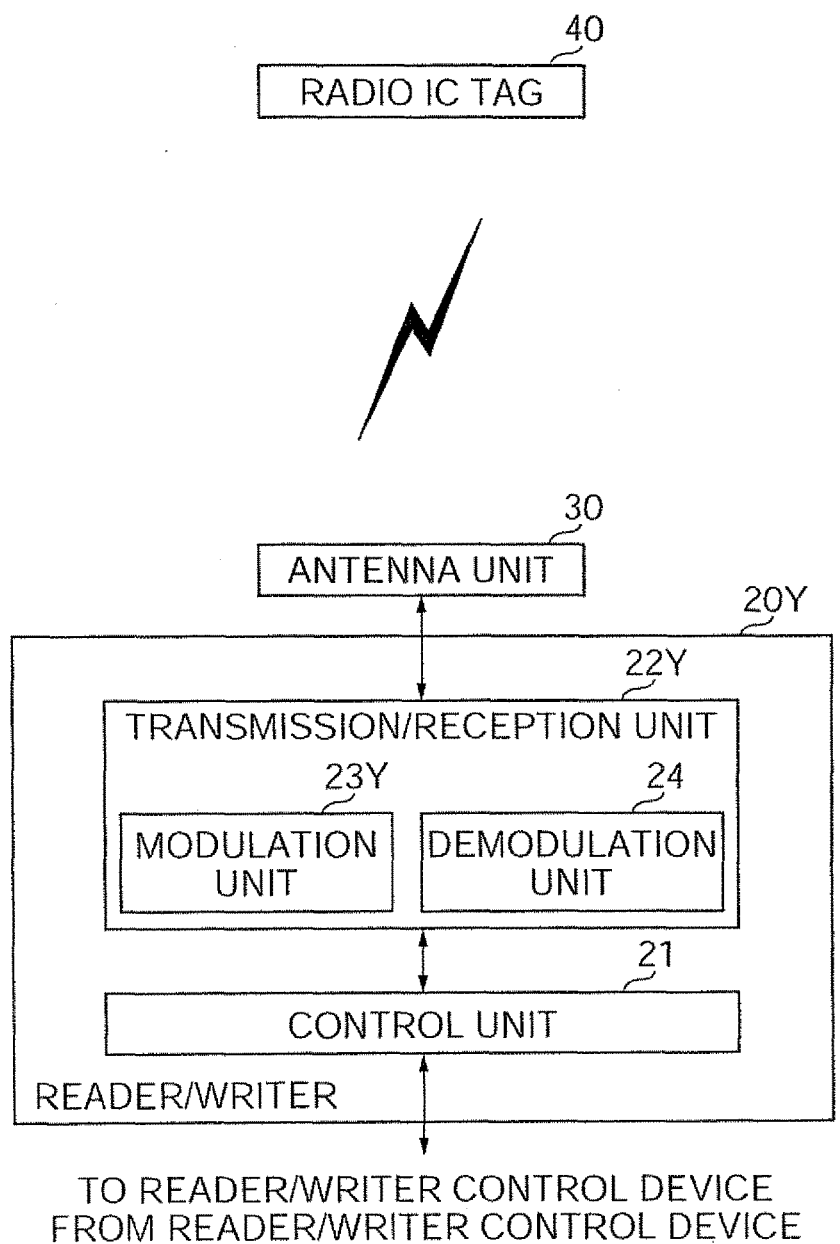
FIG. 22 is a block diagram showing the function of an example of the configuration of the reader/writer according to the fourth embodiment.

FIG. 22 is a block diagram showing the function of an example of the configuration of a reader/writer 20Y according to the fourth embodiment. The same component as the reader/writer 20X according to the fourth embodiment is assigned the same reference numeral.

The reader/writer 20Y includes the control unit 21 constituted by a CPU, etc. and a transmission/reception unit 22Y connected to the control unit 21 as a circuit for wireless transmission and reception such as modulation, demodulation, amplification, etc. The antenna unit 30 is connected to the transmission/reception unit 22Y. The control unit 21 receives an instruction from the reader/writer control device 10 or the positioning device 50, drives the transmission/reception unit 22Y according to the instruction, and transmits the data output from the transmission/reception unit 22Y (a specific ID, etc. read from the radio IC tag 40) to the positioning device 50. The control unit 21 changes the radiation characteristic of the antenna unit 30 (for example, the electric field pattern, the beam direction, the beam width, the polarization direction (vertical polarization, horizontal polarization, counterclockwise circular polarization, and clockwise circular polarization), etc.). The antenna (not shown in the attached drawings) provided for the antenna unit 30 can be an antenna capable of changing the radiation characteristic under the control described about the first or third embodiment, for example, a phased array antenna, etc.

The transmission/reception unit 22Y communicates with the radio IC tag 40 by wireless through the antenna unit 30. The transmission/reception unit 22Y has a modulation unit 23Y and the demodulation unit 24. The modulation unit 23Y modulates a carrier wave according to a signal corresponding to the information such as a predetermined command, request, instruction, etc. received from the control unit 21 in a predetermined modulation system, and generates a transmission signal (modulated carrier wave). The modulation unit 23Y selectively switches and modulates the frequency of a carrier wave.

Figure 23:
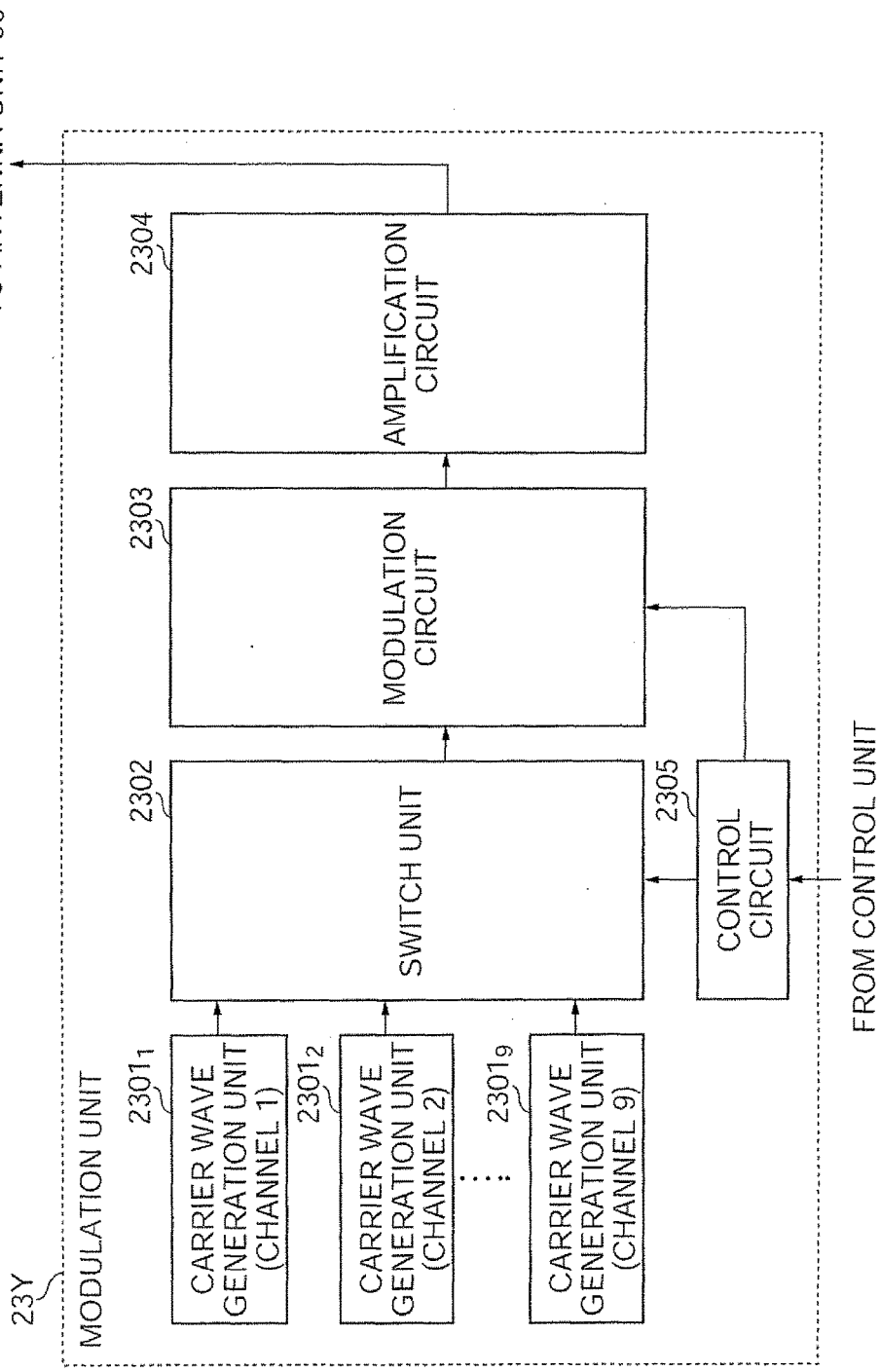
FIG. 23 is a block diagram showing an example of the configuration of the modulation unit.

FIG. 23 is a block diagram showing an example of the configuration of the modulation unit 23Y. In the configuration example shown in FIG. 23, the modulation unit 23Y has a plurality of carrier wave generation units $2301_1 \sim 2301_9$. In this example, it is the reader/writer 20Y of the UHF band (860 MHz~960 MHz), and each of the carrier wave generation units $2301_1 \sim 2301_9$ corresponds respectively to the nine channels obtained by dividing the band by a 200 KHz step. Therefore, the wavelengths of the carrier waves generated by the carrier wave generation units $2301_1 \sim 2301_9$ are different, and it is estimated that the position of the dead spot generated in the communication area changes depending on the wavelength when each of the carrier wave generation units $2301_1 \sim 2301_9$ is selected.

In the above-mentioned example of the configuration, a carrier wave generation unit is provided for each channel, but the frequency of a carrier wave can be switched by a frequency synthesizer circuit.

A switch unit 2302 selects the output of one of the carrier wave generation units $2301_1 \sim 2301_9$ as a carrier wave, and transmits it to a modulation circuit 2303. From which unit among the carrier wave generation units $2301_1 \sim 2301_9$ an output signal is selected is determined by a command from a control circuit 2305.

The modulation circuit 2303 modulates an output signal from the carrier wave generation unit 2301 selected by the switch unit 2302 using an information signal (for example, a bit string expressing a message, a command, etc.) received from the control circuit 2305 by the predetermined modulation system.

An amplification circuit 2304 amplifies an output signal (carrier wave) modulated by the modulation circuit 2303 up to the output level at which the signal can be radiated from an antenna, and supplies it to the antenna unit 30.

That is, the modulation unit 23Y having the above-mentioned configuration can output a read signal of the radio IC tag 40 by changing the frequency, that is, the wavelength. The positioning system 1500 reads the radio IC tag 40 for each carrier wave having a different wavelength.

The explanation of the reader/writer 20Y is continued below by referring to FIG. 22.

The demodulation unit 24 demodulates the carrier wave modulated by a predetermined modulation system (for example, load modulation, etc.) based on the signal depending on the data stored in the radio IC tag 40, retrieves a signal depending on the data, and transmits it to the control unit 21. The demodulation unit 24 has the function of measuring the reception intensity of a signal by load modulation, etc., and transmits the reception intensity obtained by the measurement to the control unit 21 together with the signal obtained as a result of the demodulation.

The antenna unit 30 is the same as that according to the third embodiment. That is, the antenna unit 30 radiates the modified carrier wave received from the transmission/reception unit 22Y, more specifically the modulation unit 23Y, into the air, radiates the radio waves toward the radio IC tag 40 and simultaneously receives the carrier wave of, for example, load modulation, etc. transmitted from the radio IC tag 40, and provides the carrier wave for the transmission/reception unit 22Y, more specifically the demodulation unit 24. The antenna (not shown in the attached drawings) provided for the antenna unit 30 can be an antenna capable of varying the radiation characteristic by control as described above by referring to the first embodiment. The antenna can be, for example, a phased array antenna, etc.

It is not necessary to separate the antenna unit 30 from the reader/writer 20Y, but the antenna unit 30 can be stored in the housing of the reader/writer 20Y. The antenna unit 30 is formed by a transmitting antenna/receiving antenna and a case for protecting them. The antenna unit 30 is a device or a unit separate from the body of the reader/writer storing the control unit 21 and the transmission/reception unit 22Y, and connected to the reader/writer via a cable, etc. Therefore, the antenna unit 30 is designed to be mounted in a place separate from the body of the reader/writer. It is also possible to connect a plurality of antenna units 30 which are mounted in different places to one reader/writer, and the body of the reader/writer switches and uses the antenna units 30.

As another example of the configuration, the embodiment can be realized by incorporating one of a plurality of antenna units 30 connected to the reader/writer 20Y into the reader/writer 20Y.

The control unit 21 reads the radio IC tag 40 by allowing the switch unit 2302 to switch the carrier wave generation units $2301_1 \sim 2301_9$. The control unit 21 records the reception intensity of the radio waves returned as an answer from the radio IC tag 40 when a read is performed for each carrier wave (channel in this case). The recorded reception intensity of the radio waves is transmitted to the positioning device 50 through the reader/writer control device 10.

[D.2. Positioning Device]

The positioning device 50 according to the fourth embodiment has the same basic configuration as the positioning device 50 according to the third embodiment, and a different point is the data stored in the read result storage unit 502.

FIG. 24 shows an example of data (read result data) stored in the read result storage unit 502 (refer to FIG. 17) according to the fourth embodiment. The read result data shown in FIG. 24 is an example of storing a read result from a reader/writer 20Y as a table. A table 2400 is stored in the read result storage unit 502 for each antenna unit 30 or each antenna provided for the antenna unit 30.

The table 2400 has a record 2401 for each specific ID read by the reader/writer 20Y. Each record 2401 has a specific ID field 2402 storing a specific ID, a channel 1 field 2403 storing the radio wave intensity received from the radio IC tag 40 having a corresponding specific ID in the reading process using the carrier wave generation units 2301 (for generating a carrier wave of a frequency corresponding to the channel 1), a channel 2 field 2404 storing the radio wave intensity received from the radio IC tag 40 having a corresponding specific ID in the reading process using the carrier wave generation units $2301_2$ (for generating a carrier wave of a frequency corresponding to the channel 2), a channel 9 field 2405 storing the radio wave intensity received from the radio IC tag 40 having a corresponding specific ID in the reading process using the carrier wave generation units $2301_9$ (for generating a carrier wave of a frequency corresponding to the channel 9), an evaluated radio wave intensity field 2406 determined by totally judging the radio wave intensity when a carrier wave of each channel is used, and an estimated distance field 2407 determined based on the evaluated radio wave intensity. The table 2400 includes a channel field corresponding to the channels 3 to 8, but is omitted in FIG. 24.

The specific ID field 2402 stores a specific ID received from the reader/writer 20Y. Since one record stores one specific ID, 50 records 2401 are generated in the table 50, when, for example, 50 specific IDs are read in one reading operation.

Each of the channel fields 2403 to 2405 stores the information corresponding to the radio wave intensity received when the corresponding channel is being used.

The evaluated radio wave intensity field 2406 stores a value obtained by totally judging the radio wave intensity when a reading process is performed using a carrier wave of each channel while changing the radiation characteristic (for example, electric field pattern, beam direction, beam width) of an antenna for each antenna unit 30. For example, the reader/writer 20Y changes the radiation characteristic of an antenna for each of the antenna units 30 such that the beam direction is the first direction, performs the reading process by switching and transmitting the channels, then changes the radiation characteristic of the antennas such that the beam direction can be the second direction different from the first direction, and performs the reading process by switching and transmitting the channels. At this time, the positioning system 1500, more specifically the reader/writer 20Y, measures the reception intensity of the signal from the radio IC tag 40 in the reading process, and stores it. Although there are various methods of totally judging the radio wave intensity received from a radio IC tag when a carrier wave of each channel is used, the highest radio wave intensity is defined as evaluated radio wave intensity in the present embodiment.

The estimated distance field 2407 stores the distance estimated based on the evaluated radio wave intensity stored in the evaluated radio wave intensity field 2406, that is, the estimated distance between the radio IC tag 40 having the specific ID corresponding to the record and the antenna unit 30. The estimated distance is the information calculated by the position calculation unit 503. In this example, it is a part of the table 2400, but it is not necessary that the information is a part of the table 2400.

As described above, the above-mentioned table 2400 is generated for each antenna unit 30 or each antenna provided for the antenna unit 30. Therefore, the estimated distance between one radio IC tag 40 and each antenna unit 30 or each antenna provided for the antenna unit 30 is finally stored in the read result storage unit 502.

The position calculation unit 503 calculates the estimated distance between the antenna unit 30 or each antenna provided for the antenna unit 30 and the radio IC tag 40 having each specific ID based on the evaluated radio wave intensity stored in the evaluated radio wave intensity field 2407, and the radio IC tag 40 having each specific ID is calculated based on each estimated distance.

Since the method of calculating the estimated position is the same as the third embodiment, the details are omitted here.

Thus, since the positioning system 1500 and the positioning device 50 according to the present embodiment perform a reading process by switching the carrier frequency of read radio waves transmitted to the radio IC tag 40 while changing the radiation characteristic of an antenna, a dead spot of read radio waves can be changed. Therefore, when a read is performed using a carrier wave of a frequency, the radio IC tag 40 that returned no answer to the reader/writer 20Y because it is located at a dead spot can exit the dead spot when a read is performed using a carrier wave of another frequency. Thus, it is expected that the reception intensity from the radio IC tag 40 can be obtained correctly at any frequency. By totally judging the reception intensity obtained when each carrier wave is used, the correct reception intensity can be obtained from the radio IC tag 40, and a more correct or appropriate position of the radio IC tag 40 can be designated.

E. Fifth Embodiment

The fifth embodiment is explained below. The fifth embodiment of the present invention is proposed as a system for designating a position with higher accuracy by reading the radio IC tag 40 while processing a dead spot in the positioning system for designating the position of the radio IC tag 40.

The positioning system according to the fifth embodiment includes the reader/writer 20 for reading the radio IC tag 40, the reader/writer control device 10 for controlling the reading operation of the reader/writer 20, and a positioning device 50Z for designating the position of the radio IC tag based on the number of successful reads or the success rate for the specific ID of the radio IC tag 40 read by the reader/writer 20.

The positioning system according to the fifth embodiment has the same configuration as the positioning system 1500 according to the third embodiment except that the present system has the positioning device 50Z instead of the positioning device 50 (refer to FIG. 15).

[E.1. Reader/Writer and Radio IC Tag]

The configurations of the reader/writer control device 10, the reader/writer 20, and the radio IC tag 40 used for the positioning system according to the fifth embodiment are the same as those according to the third embodiment. Therefore, the detailed explanation of them is omitted here.

[E.2. Positioning Device]

The positioning device 50Z has the function of designating the position of the radio IC tag 40 based on the number of successful reads or success rate relating to the specific ID of the radio IC tag 40 read by the reader/writer 20.

The positioning device 50Z is provided with an arithmetic operation unit (CPU), a main memory (RAM), a read-only memory (ROM), an input/output device (I/O), and an external storage device such as a hard disk device, etc. as necessary, and can be, for example, an information processing device such as a computer, a work station, etc. The ROM, a hard disk device, etc. store a program to allow the information processing device to function as the positioning device 50Z, or a program used to direct a computer to use the positioning method. By loading the programs into the RAM and allowing the CPU to execute it, the positioning device 50Z is realized or the positioning method is executed.

Figure 25:
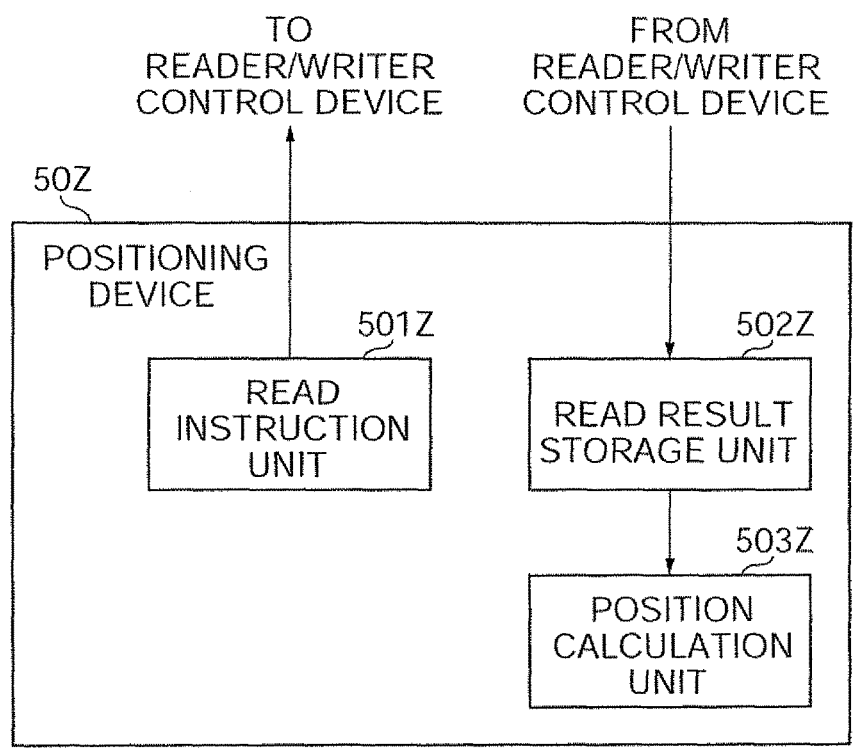
FIG. 25 is a block diagram showing the function of an example of the positioning device according to the fifth embodiment.

FIG. 25 is a block diagram of the function showing an example of the positioning device 50Z.

The positioning device 50Z includes a read instruction unit 501Z, a read result storage unit 502Z, and a position calculation unit 503Z.

The read instruction unit 501Z has the function of issuing to each reader/writer 20 an instruction to perform a reading process at a predetermined frequency. Each reader/writer 20 performs the reading process at a predetermined frequency while changing the radiation characteristic of an antenna at the instruction. For example, the reader/writer 20 performs a read while changing the radiation characteristic of the antenna such that the beam direction of the antenna can be the first direction, then performs a read while changing the radiation characteristic of the antenna such that the beam direction of the antenna can be the second direction different from the first direction, thereby completing one reading process. If a read is successfully performed in any beam direction, it is assumed that the reading process has been successfully performed, and the notification of the successful process is transmitted to the positioning device 50Z.

In the present embodiment, it is assumed that the predetermined frequency refers to 100 times, but the present invention is not limited to the number of times. The predetermined frequency can be a value other than the fixed number of times, and the predetermined frequency can be appropriately changed depending on the communication environment in the environment of the positioning system 1500. A different predetermined frequency can also be set for each reader/writer 20 or antenna unit 30.

Each time a reading process is performed, each reader/writer 20 communicates with all radio IC tags 40 in the communication area of the reader/writer 20, and as a result of the communications, notifies the positioning device 50Z, more specifically the read result storage unit 502Z, of all specific IDs for which a read has been successfully performed.

The read result storage unit 502Z has the function of storing a read result received from the reader/writer 20. FIG. 26 shows an example of the read result data stored in the read result storage unit 502X. The read result data shown in FIG. 26 is an example of storing a result of a read from a reader/writer as a table. The table 50 is stored in the read result storage unit 502Z for each antenna unit 30.

A table 2600 includes a record 2601 for each specific ID read by the reader/writer 20. Each record 2601 includes a specific ID field 2602 storing a specific ID, a first field 2603 storing information as to whether or not a corresponding specific ID has been successfully read as a result of the first reading process, a second field 2604 storing information as to whether or not a corresponding specific ID has been successfully read as a result of the second reading process, a third field 2605 storing information as to whether or not a corresponding specific ID has been successfully read as a result of the third reading process, . . . , (omitted from the fourth field to the 99th field), a 100th field 2606 storing information as to whether or not a corresponding specific ID has been successfully read as a result of a predetermined frequency, that is, the 100th reading process, a successful frequency field 2607 storing the number of successful reads in the results of the reading processes from the first to the 100th process, and an estimated distance field 2608 determined based on the number of successful reads.

The specific ID field 2602 stores the specific ID received from the reader/writer 20. Since one record store one specific ID, when, for example, 50 specific IDs are read in one reading operation, 50 records 2601 are generated in the table 2600.

In the fields from the first field 2603 to the 100th field 2606, the information as to whether or not a corresponding specific ID has been transmitted from the reader/writer 20 as a result of the current reading process. In this example, "1" indicates that the corresponding specific ID has been received from the reader/writer 20 as a result of the current reading process, that is, "0" indicates that the corresponding specific ID has not been received from the reader/writer 20 as a result of the current reading process, that is, the radio IC tag 40 having a specific ID has not been successfully read.

The successful frequency field 2607 stores the number of fields storing the information that the corresponding specific ID has been given from the reader/writer 20 in the fields from the first field 2603 to the 100th field 2606, that is, the number of successful reads of the radio IC tags having the specific ID corresponding to the record 2601.

The estimated distance field 2608 stores the distance estimated based on the number of successful reads stored in the successful frequency field 2607, that is, the estimated distance between the radio IC tag having a specific ID corresponding to the record and the antenna unit 30. The estimated distance is the information calculated by the position calculation unit 503Z described later. In this example, it is a part of the table 2600, but it is not always necessary that the information is a part of the table 2600.

As described above, the table 2600 is generated for each antenna unit 30.

The position calculation unit 503Z calculates the estimated distance between each reader/writer 20 and the radio IC tag 40 having each specific ID based on the number of successful reads stored in the successful frequency field 2607, and calculates the radio IC tag 40 having each specific ID based on each estimated distance.

Figure 27:
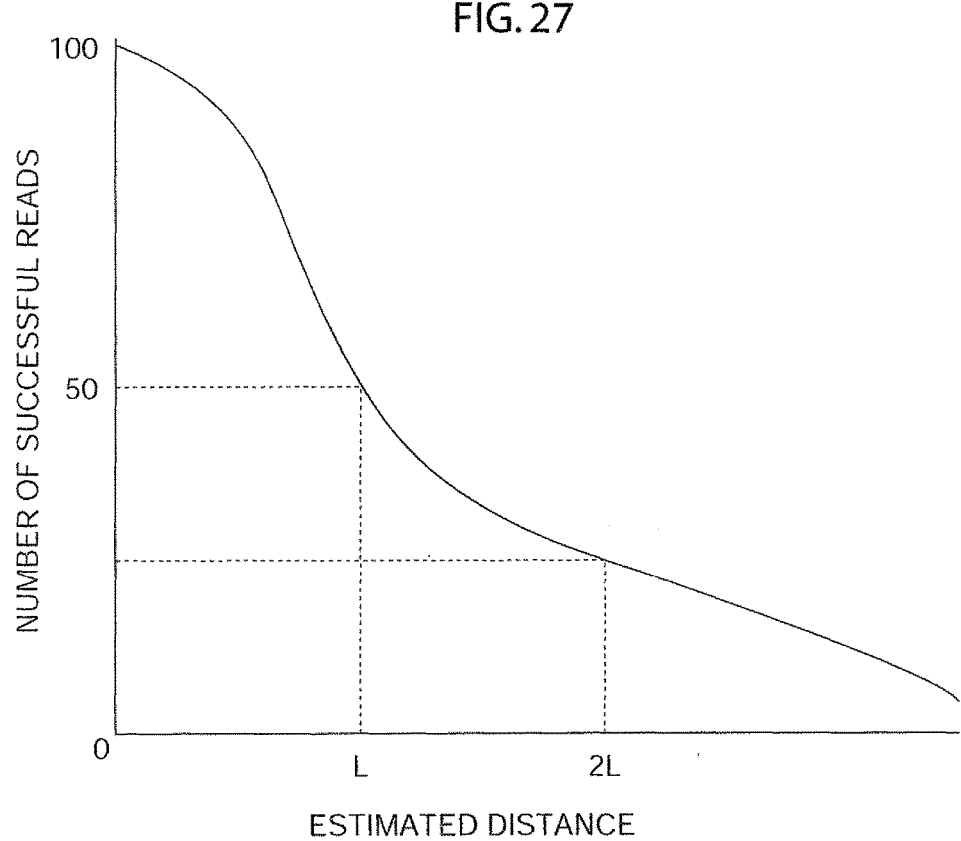
FIG. 27 shows an example of the data for use by the position calculation unit calculating the estimated distance from the number of successful reads.

FIG. 27 shows an example of the data for use by the position calculation unit 503Z in calculating the estimated distance from the number of successful reads. The data shown in FIG. 27 is expressed as a graph for uniquely defining the estimated distance depending on the value of the number of successful reads (vertical axis). For example, the estimated distance of 0 can be assigned to the number of successful reads 100, the estimated distance of L can be assigned to the number of successful reads 50, and the estimated distance of 2 L can be assigned to the number of successful reads 25. The data can be generated by obtaining the statistics of the number of successful reads while changing the distance between the radio IC tag 40 and the reader/writer 20, but the data can also be generated in other methods.

FIG. 28 shows an example of a table storing the result of the position calculation unit 503Z calculating the estimated position of the radio IC tag 40 based on the estimated distance calculated from the number of successful reads. In this example, a position is designated using two different antenna units 30 (hereinafter identified as an antenna unit A and an antenna unit B). A table 2800 has one record 2801 for each specific ID. Each record 2801 has a specific ID field 2802 storing a specific ID, a first estimated distance field 2803 storing the estimated distance to the antenna unit A, a second estimated distance field 2804 storing the estimated distance to the antenna unit B, and an estimated position field 2805 storing the estimated position of the radio IC tag 40 corresponding to the specific ID.

The estimated position calculated as described above is stored in the estimated position field 2805 of each record 2801. The positioning device 50Z outputs an estimated position for each specific ID by referring to the table 2800, and can provide the estimated position of each radio IC tag for a user.

According to the present embodiment, the position detection by a read of the radio IC tag 40 can be performed with higher accuracy without an influence of the fluctuation of the radio wave propagation status.

F. Variation Example, Others (1) A time stamp (time information) is added to the data indicating the reception intensity output by the readers/writers 20X and 20Y and transmitted to the positioning device 50, and the positioning device 50 generates the table 2400 for each time point to output the estimated position of the radio IC tag 40 for each time point.

(2) The present invention can be applied by combining the third and fourth embodiments. That is, the radio IC tag 40 can be read by switching the direction of polarization for each carrier wave of each frequency while switching the radiation characteristic of an antenna, the intensity of a signal (received signal intensity) to be returned from the radio IC tag 40 to the reader/writer 20X (20Y) can be measured, and the estimated position of the radio IC tag 40 can be output based on the measurement result.

(3) In the above-mentioned fifth embodiment, the estimated distance is determined based on the number of successful reads, but the estimated distance can be determined based on the success rate (number of successful reads/total number of reading processes).

(4) In addition to the above-mentioned number of successful reads, the radio wave intensity at the response transmission time from the radio IC tag 40 at each read success time can be recorded, the estimated distance can be calculated based on each of the number of successful reads and the radio wave intensity, and the estimated distance of the position can be calculated from both estimated distances.

ADVANTAGES OF THE INVENTION

According to the present invention, a data reader capable of reading data can be provided regardless of the position of a radio IC tag without an occurrence of a read disabled or difficult read position/area due to the interference with radio waves for a read radiated by the data reader.

According to another aspect of the present invention, the position of an occurrence of a read disabled or difficult read position/area due to the interference with radio waves for a read radiated by the data reader can be changed depending on the phase change of a carrier wave, thereby reading data without failing in reading any data regardless of the location of a radio IC tag.

According to a further aspect of the present invention, the position of a storage medium can be designated without a read error due to a dead spot.

Additional advantages and modifications will readily occur to those skilled in the art. Therefore, the invention in its broader aspects is not limited to the specific details or representative embodiments shown and described herein. Accordingly, various modifications may be made without departing from the spirit or scope of the general inventive concept as defined by the appended claims and their equivalents.

What is claimed is:
1. A positioning system, comprising:
a plurality of antenna units mounted in different places to read data from storage mediums each having a storage unit for storing data and a communicating antenna for transmission of the data stored in the storage unit, by using radio waves having different polarization directions;
a control unit connected to each antenna unit, for controlling each antenna unit to sequentially change radiation characteristics of each antenna unit;
an antenna switch unit for selectively driving the antenna units in accordance with a control instruction from the control unit to transmit the radio wave having desired polarization directions according to each antenna unit by switching the antenna units; and
a positioning unit for calculating the position of each storage medium on the basis of strengths of signals, the strengths of the signals being obtained as a result of read operations of the data stored in the storage mediums, by using radio waves having different polarization directions, while having each antenna unit sequentially change its radiation characteristics.
2. The positioning system according to claim 1, wherein the control unit sequentially changes the radiation characteristics of each antenna unit such that no dead spot occurs at a position in which each storage medium is located at one or more time points among a plurality of time points.

3. The positioning system according to claim 1, wherein the control unit performs the read operations at a plurality of time points, respectively, and determines whether each of the read operations is successful, and wherein each of the read operations is performed by changing the radiation characteristics.

4. A positioning system, comprising:
a plurality of antenna units mounted in different places to read data from storage mediums each having a storage unit for storing data, and a communicating antenna for transmission of the data stored in the storage unit, by using radio waves having different center frequencies;
a control unit connected to each antenna unit, for controlling each antenna unit to sequentially change radiation characteristics of each antenna unit;
an antenna switch unit for selectively driving the antenna units in accordance with a control instruction from the control unit to transmit the radio wave having desired polarization directions according to each antenna unit by switching the antenna units; and
a positioning unit for calculating the position of each storage medium on the basis of strengths of signals, the strengths of the signals being obtained as a result of read operations of the data of the storage mediums, by using radio waves having different central frequencies, while having each antenna unit sequentially change its radiation characteristics.

5. The positioning system according to claim 4, wherein the control unit sequentially changes the radiation characteristics of each antenna unit such that no dead spot occurs at a position in which each storage medium is located at one or more time points among a plurality of time points.

6. The positioning system according to claim 4, wherein the control unit performs the read operations at a plurality of time points, respectively, and determines whether each of the read operations is successful, and wherein each of the read operations is performed by changing the radiation characteristics.

7. A positioning system, comprising:
a plurality of antenna units mounted in different places to read data from storage mediums each having a storage unit for storing data and a communicating antenna for transmission of the data stored in the storage unit, by using radio waves having different polarization directions and center frequencies;
a control unit connected to each antenna unit, for controlling each antenna unit to sequentially change radiation characteristics of each antenna unit;
an antenna switch unit for selectively driving the antenna units in accordance with a control instruction from the control unit to transmit the radio wave having desired polarization directions according to each antenna unit by switching the antenna units; and
a positioning unit for calculating the position of each storage medium on the basis of strengths of signals, the strengths of the signals being obtained as a result of read operations of the data stored in the storage mediums by using radio waves having different polarization directions and different central frequencies, while having each antenna unit sequentially change its radiation characteristics.

8. The positioning system according to claim 7, wherein the control unit sequentially changes the radiation characteristics of each antenna unit such that no dead spot occurs at a position in which each storage medium is located at one or more time points among a plurality of time points.

9. The positioning system according to claim 7, wherein the control unit performs the read operations at a plurality of time points, respectively, and determines whether each of the read operations is successful, and wherein each of the read operations is performed by changing the radiation characteristics.

10. A positioning system, comprising:
a plurality of antenna units mounted in different places to read data from storage mediums each having a storage unit for storing data and a communicating antenna for transmission of the data stored in the storage unit;
a control unit connected to each antenna unit, for controlling each antenna unit to sequentially change radiation characteristics of each antenna unit;
an antenna switch unit for selectively driving the antenna units in accordance with a control instruction from the control unit to transmit the radio wave having desired polarization directions according to each antenna unit by switching the antenna units; and
a positioning unit for calculating the position of each storage medium by using the number of succeeded read operations which is obtained by having each antenna unit read the storage mediums, while having each antenna unit sequentially change its radiation characteristics.

11. The positioning system according to claim 10, wherein:
the positioning unit records an intensity of signals received from each storage medium when a read operation is successfully performed on each storage medium, and calculates the position of each storage medium by using the intensity of the signal together with the number of succeeded read operations.

12. The positioning system according to claim 10, wherein the control unit sequentially changes the radiation characteristics of each antenna unit such that no dead spot occurs at a position in which each of the storage mediums is located at one or more time points among a plurality of time points.

13. The positioning system according to claim 10, wherein the control unit performs the read operations at a plurality of time points, respectively, and determines whether each of the read operations is successful, and wherein each of the read operations is performed by changing the radiation characteristics.

* * * * *